United States Patent
Cho et al.

(10) Patent No.: US 12,553,903 B2
(45) Date of Patent: Feb. 17, 2026

(54) IVALTINOSTAT COMBINATION THERAPY FOR TREATING PANCREATIC CANCER

(71) Applicant: CG Pharmaceuticals, Inc, Orinda, CA (US)

(72) Inventors: Sangsook Cho, Moraga, CA (US); Joong Myung Cho, Seoul (KR)

(73) Assignee: CG Pharmaceuticals, Inc, Orinda, CA (US)

(*) Notice: Subject to any disclaimer, the term of this patent is extended or adjusted under 35 U.S.C. 154(b) by 0 days.

(21) Appl. No.: 18/657,510

(22) Filed: May 7, 2024

(65) Prior Publication Data

US 2024/0402191 A1    Dec. 5, 2024

Related U.S. Application Data

(60) Provisional application No. 63/505,608, filed on Jun. 1, 2023.

(51) Int. Cl.
| | |
|---|---|
| *A61K 31/7068* | (2006.01) |
| *A61K 9/00* | (2006.01) |
| *A61K 31/165* | (2006.01) |
| *A61K 31/517* | (2006.01) |
| *A61P 35/04* | (2006.01) |
| *C12Q 1/37* | (2006.01) |
| *G01N 33/68* | (2006.01) |

(52) U.S. Cl.
CPC ....... *G01N 33/6893* (2013.01); *A61K 9/0019* (2013.01); *A61K 31/165* (2013.01); *A61K 31/517* (2013.01); *A61K 31/7068* (2013.01); *A61P 35/04* (2018.01); *C12Q 1/37* (2013.01); *G01N 2333/4706* (2013.01); *G01N 2333/70596* (2013.01); *G01N 2333/8146* (2013.01); *G01N 2333/96419* (2013.01)

(58) Field of Classification Search
CPC ....... G01N 33/6893; G01N 2333/4706; G01N 2333/70596; G01N 2333/8146; G01N 2333/96419; A61K 9/0019; A61K 31/165; A61K 31/517; A61K 31/7068; A61P 35/04; C12Q 1/37
See application file for complete search history.

(56) References Cited

U.S. PATENT DOCUMENTS

| | | | |
|---|---|---|---|
| 5,073,376 | A | 12/1991 | Kohl et al. |
| 5,710,149 | A | 1/1998 | Cliffe |
| 7,696,374 | B2 | 4/2010 | Abouabdellah et al. |
| 8,053,435 | B2 | 11/2011 | Lee et al. |
| 8,563,745 | B2 | 10/2013 | Nakamura et al. |
| 11,655,207 | B2 | 5/2023 | Cho et al. |
| 2009/0156674 | A1 | 6/2009 | Macher et al. |
| 2010/0323988 | A1 | 12/2010 | Wu et al. |
| 2011/0207769 | A1 | 8/2011 | Catena et al. |
| 2014/0093565 | A1 | 4/2014 | Drott et al. |
| 2017/0209574 | A1 | 7/2017 | Cao et al. |
| 2017/0327582 | A1 | 11/2017 | Bissonnette et al. |
| 2018/0355042 | A1 | 12/2018 | Bissonnette et al. |
| 2019/0030011 | A1 | 1/2019 | Pili |
| 2021/0000951 | A1 | 1/2021 | Cao et al. |
| 2021/0346321 | A1* | 11/2021 | Cho ............ A61K 9/4858 |
| 2022/0287993 | A1 | 9/2022 | Kim et al. |
| 2025/0152526 | A1 | 5/2025 | Cho et al. |

FOREIGN PATENT DOCUMENTS

| | | |
|---|---|---|
| CN | 101573327 A | 11/2009 |
| EP | 3508224 A1 | 7/2019 |
| EP | 3851104 A1 | 7/2021 |
| KR | 10-2007-0047024 A | 5/2007 |
| KR | 100711944 B1 | 5/2007 |
| KR | 10-0814100 B1 | 3/2008 |
| KR | 100814092 B1 | 3/2008 |
| KR | 101388596 B1 | 4/2014 |
| WO | WO 2003/076395 A1 | 9/2003 |
| WO | WO 2004/063146 A1 | 7/2004 |
| WO | WO 2004/065354 A1 | 8/2004 |
| WO | WO 2004/076386 A1 | 9/2004 |
| WO | WO 2005/123193 A1 | 12/2005 |
| WO | WO 2007/052938 A1 | 5/2007 |
| WO | WO 2008/054154 A1 | 5/2008 |
| WO | WO 2010/067980 A1 | 6/2010 |
| WO | WO 2016/153839 A1 | 9/2016 |
| WO | WO 2016/154068 A1 | 9/2016 |
| WO | WO 2019/043176 A2 | 3/2019 |
| WO | WO 2019/079596 A1 | 4/2019 |

OTHER PUBLICATIONS

Mukherjee et al. Gemcitabine-based or capecitabine-based chemoradiotherapy for locally advanced pancreatic cancer (SCALOP): a multicentre, randomised, phase 2 trial, The Lancet, vol. 14, p. 317-326. (Year: 2013).*

Jo et al., P-385 A phase 1/2 study of combination therapy of ivaltinostat, gemcitabine, and erlotinib in patients with unresectable, locally advanced and metastatic pancreatic adenocarcinoma, Annals of Oncology, vol. 31, Abstract only . (Year: 2020).*

Katsuta et al., Pancreatic adenocarcinomas with mature blood vessles have better overall survival, Scientific reports, vol. 9, p. 1-11. (Year: 2019).*

Lee at al,, A novel HDAC inhibitor, CG200745, inhibits pancreatic cancer cell growth and overcomes gemcitabine resistance, Scientific Reports, vol. 7, p. 1-9. (Year: 2017).* https://www.cancer.gov/research/participate/clinical-trials-search/v?id=NCI-2022-04655 (Year: 2022).*

(Continued)

*Primary Examiner* — Adam Weidner
*Assistant Examiner* — Tiffany M Gough
(74) *Attorney, Agent, or Firm* — Knobbe, Martens, Olson & Bear, LLP

(57) ABSTRACT

Embodiments of the present disclosure relates to ivaltinostat combination therapy for treating pancreatic cancer in subjects having low levels of serological protein biomarkers with negative correlation to progression-free survival (PFS).

30 Claims, 4 Drawing Sheets

(56) References Cited

OTHER PUBLICATIONS

Ahmed et al., A G-Quadruplex-Binding Small Molecule and the HDAC Inhibitor SAHA (Vorinostat) Act Synergistically in Gemcitabine-Sensitive and Resistant Pancreatic Cancer Cells, Molecules Nov. 19, 2020;25(22): 5407.

Autin et al., Epigenetic Drugs for Cancer and microRNAs: A Focus on Histone Deacetylase Inhibitors. Cancers, Oct. 10, 2019;11(10):1530; 22 pages.

Bailey et al., Genomic Analyses Identify Molecular Subtypes of Pancreatic Cancer, Nature Mar. 3, 2016;531(7592): 47-52.

Berger et al., Detection of Hot-Spot Mutations in Circulating Cell-Free DNA From Patients With Intraductal Papillary Mucinous Neoplasms of the Pancreas, Gastroenter. Aug. 1, 2016;151(2): 267-270.

Biankin et al., Pancreatic Cancer Genomes Reveal Aberrations in Axon Guidance Pathway Genes, Nature Nov. 15, 2012:491(7424): 399-405.

Bloomston et al., TIMP-1 Antisense Gene Transfection Attenuates the Invasive Potential of Pancreatic Cancer Cells in vitro and Inhibits Tumor Growth in vivo, The Am J Surg. Jun. 1, 2005;189(6): 675-679.

Cai et al., Depletion of HDAC1, 7 and 8 by Histone Deacetylase Inhibition Confers Elimination of Pancreatic Cancer Stem Cells in Combination with Gemcitabine, Sci Rep Jan. 26, 2018;8(1): 1621.

Chan et al., Phase I Trial of Vorinostat Added to Chemoradiation with Capecitabine in Pancreatic Cancer, Radiother Oncol. May 1, 2016;119(2):312-318.

Cartwright et al., Phase II Study of Oral Capecitabine in Patients with Advanced or Metastatic Pancreatic Cancer, J Clin Oncol. Jan. 1, 2002;20(1):160-164.

Chan et al., Phase I/II Study of Mocetinostat in Combination With Gemcitabine for Patients With Advanced Pancreatic Cancer and Other Advanced Solid Tumors, Cancer Chemother Pharmacol. Feb. 2018;81: 355-364.

Chemical Abstract Registry No. 2173017-02-0, indexed in the Registry File on STN CAS Online Feb. 7, 2018; 1 page.

Cheng et al., Analysis of ctDNA to Predict Prognosis and Monitor Treatment Responses in Metastatic Pancreatic Cancer Patients, Int J Cancer. May 15, 2017;140(10): 2344-2350.

Choi et al., Histone Deacetylase Inhibitor, CG200745 Attenuates Renal Fibrosis in Obstructive Kidney Disease, Sci Rep. Aug. 1, 2018;8(1): 11546.

Choudhary et al., Lysine Acetylation Targets Protein Complexes and Co-Regulates Major Cellular Functions, Science. Aug. 14, 2009;325(5942): 834-840.

Chun et al., Epigenetic Modulation with HDAC Inhibitor CG200745 Induces Anti-Proliferation in Non-Small Cell Lung Cancer Cells, PLoS One. Mar. 17, 2015;10(3): e0119379.

Coiffier et al., Results From a Pivotal, Open-Label, Phase II Study of Romidepsin in Relapsed or Refractory Peripheral T-cell Lymphoma After Prior Systemic Therapy, J Clin Oncol Feb. 20, 2012;30(6): 631-636.

Conroy et al., Folfirinox Versus Gemcitabine for Metastatic Pancreatic Cancer, N Engl J Med 2011; 364(19): 1817-1825.

Crystallization and Precipitation. (2016). Retrieved from https://www.mt.com/us/en/home/applications/L1_AutoChem_Applications/L2_Crystallization.html#publications; 24 pages.

Damaskos et al., Histone Deacetylase (HDAC) Inhibitors: Current Evidence for Therapeutic Activities in Pancreatic Cancer, Anticancer Res. Jun. 1, 2015;35(6): 3129-35.

Diana et al., Prognostic Role and Correlation of CA9, CD31, CD68 and CD20 With the Desmoplastic Stroma in Pancreatic Ductal Adenocarcinoma, Oncotarget Nov. 11, 2016;7(45): 72819-72832.

Dizon et al., A Phase II Evaluation of Belinostat and Carboplatin in the Treatment of Recurrent or Persistent Platinum-Resistant Ovarian, Fallopian Tube, or Primary Peritoneal Carcinoma: A Gynecologic Oncology Group Study, Gynecol Oncol May 1, 2012;125(2): 367-371.

Dovzhanskiy et al., Experimental in vivo and in vitro Treatment with a new Histone Deacetylase Inhibitor Belinostat Inhibits the Growth of Pancreatic Cancer, BMC cancer. Dec. 2012;12: 1-9.

Feng et al., Therapeutic Potential of Histone Deacetylase Inhibitors in Pancreatic Cancer, Cancer Letts. Jun. 1, 2014;347(2): 183-190.

Feng et al., Combination of HDAC Inhibitor TSA and Silibinin Induces Cell Cycle Arrest and Apoptosis by Targeting Survivin and CyclinB1/Cdk1 in Pancreatic Cancer Cells, Biomed Pharmacother. Aug. 1, 2015;74: 257-264.

Foss et al., A Phase II Trial of Belinostat (PXD101) in Patients with Relapsed or Refractory Peripheral or Cutaneous T-Cell Lymphoma, Br J Haematol. Mar. 2015;168(6): 811-819.

Fournel et al., MGCD0103, a Novel Isotype-Selective Histone Deacetylase Inhibitor, Has Broad Spectrum Antitumor Activity in vitro And in vivo, Mol Canc Thera. Apr. 1, 2008;7(4): 759-768.

Fritsche et al., HDAC2 Mediates Therapeutic Resistance of Pancreatic Cancer Cells via the BH3-Only Protein NOXA, Gut. Oct. 1, 2009;58(10): 1399-1409.

Giaginis et al., Histone Deacetylase (HDAC)-1, -2, -4 and -6 Expression in Human Pancreatic Adenocarcinoma: Associations With Clinicopathological Parameters, Tumor Proliferative Capacity and Patients' Survival. BMC Gastroenterol. Oct. 26, 2015;15: 148; 9 pages.

Glozak et al., Acetylation and Deacetylation of Non-Histone Proteins, Gene. Dec. 19, 2005;363: 15-23.

Golan et al., Maintenance Olaparib for Germline BRCA-Mutated Metastatic Pancreatic Cancer, N Engl J Med, 2019 25;381(4): 317-327.

Gong et al., Serum Insulin-Like Growth Factor Axis and the Risk of Pancreatic Cancer: Systematic Review and Meta-Analysis, Nutrients Apr. 18, 2017;9(4):394; 13 pages.

Hajatdoost et al., Chemotherapy in Pancreatic Cancer: A Systematic Review, Medicina. Jul. 11, 2018;54(3): 48 in 17 pages.

Hammel et al., Maintenance Therapies in Metastatic Pancreatic Cancer: Present and Future with a Focus on PARP Inhibitors, Ther Adv Med Oncol. Jul. 2020;12:1758835920937949; 9 pages.

He et al., Potent Dual BET/HDAC Inhibitors for Efficient Treatment of Pancreatic Cancer, Angew Chem Int Ed Engl Feb. 17, 2020;59(8): 3028-3032.

Ikeda et al., Phase I Study of Resminostat, an HDAC Inhibitor, Combined with S-1 in Patients With Pre-Treated Biliary Tract or Pancreatic Cancer, Invest New Drugs Feb. 15, 2019;37: 109-117.

Iwahashi et al., Histone Deacetylase Inhibitor Augments Anti-Tumor Effect of Gemcitabine and Pegylated Interferon-α on Pancreatic Cancer Cells, Int Journal Clin Oncol. Dec. 2011;16: 671-678.

Jo et al., A Phase I/II Study of Ivaltinostat Combined with Gemcitabine and Erlotinib in Patients with Untreated Locally Advanced or Metastatic Pancreatic Adenocarcinoma, Intern J Cancer. Nov. 1, 2022;151(9): 1565-1577.

Jones et al., The Epigenomics of Cancer, Cell 2007;128(4): 683-892.

Jung et al., CG200745, an HDAC Inhibitor, Induces Anti-Tumour Effects in Cholangiocarcinoma Cell Lines via miRNAs Targeting the Hippo Pathway, Sci Rep. Sep. 7, 2017;7(1): 10921.

Kim et al., First-in-Human Study of the Toxicity, Pharmacokinetics, and Pharmacodynamics of CG200745, A Pan-HDAC Inhibitor, in Patients with Refractory Solid Malignancies, Invest New Drugs. Oct. 2015;33: 1048-1057.

Kim et al., Prognostic Implications of Multiplex Detection of KRAS Mutations in Cell-Free DNA from Patients with Pancreatic Ductal Adenocarcinoma, Clin Chem. Apr. 1, 2018;64(4): 726-734.

Knapinska et al., The Roles of Matrix Metalloproteinases in Pancreatic Cancer, Prog Mol Biol Transl Sci. Jan. 1, 2017;148: 339-354.

Laschanzky et al., Selective Inhibition of Histone Deacetylases 1/2/6 in Combination with Gemcitabine: A Promising Combination for Pancreatic Cancer Therapy, Cancers Sep. 7, 2019;11(9): 1327; 17 pages.

Lee et al, Histone deacetylase inhibitor, CG200745, attenuates cardiac hypertrophy and fibrosis in COCA-induced hypertensive rats, Korean J Physiol Pharmacol. vol. 20 No. 5, pp. 477-485, (2016).

(56) References Cited

OTHER PUBLICATIONS

Lee et al., A Novel HDAC Inhibitor, CG200745, Inhibits Pancreatic Cancer Cell Growth and Overcomes Gemcitabine Resistance, Sci Rep. Jan. 30, 2017;7(1): 41615 in 9 pages.
Li et al., Histone Deacetylase 6 and Cytoplasmic Linker Protein 170 Function Together to Regulate the Motility of Pancreatic Cancer Cells, Protein & Cell. Mar. 2014;5(3): 214-223.
Lin et al., IGFBP-1 in Cancer: Expression, Molecular Mechanisms, and Potential Clinical Implications, Am J Transl Res. 2021;13(3): 813-832.
Liu et al., Histone Deacetylase Inhibitor Up-Regulates RECK to Inhibit MMP-2 Activation and Cancer Cell Invasion. Cancer Res. Jun. 15, 2003;63(12): 3069-3072.
Liu et al., Clinical HDAC Inhibitors Are Effective Drugs to Prevent the Entry of SARS-CoV2, ACS Pharmacol. Transl. Sci., vol. 3, No. 6, pp. 1361-1370 (2020).
Lyu et al., HDAC Inhibitors as Antifibrotic Drugs in Cardiac and Pulmonary Fibrosis. Ther Adv Chronic Dis. Jul. 2019;10: 2040622319862697; 19 pages.
Mann et al., FDA Approval Summary: Vorinostat for Treatment of Advanced Primary Cutaneous T-cell Lymphoma, Oncologist Oct. 1, 2007;12(10): 1247-1252.
Marks, P.A., The Clinical Development of Histone Deacetylase Inhibitors as Targeted Anticancer Drugs, Expert Opin Investig Drugs. Sep. 1, 2010;19(9): 1049-1066.
McClure et al., Advances and Challenges of HDAC Inhibitors in Cancer Therapeutics, Adv Cancer Res Jan. 1, 2018;138: 183-211.
Minjie et al. Targeting Pancreatic Cancer Cells by a Novel Hydroxamate-Based Histone Deacetylase (HDAC) Inhibitor ST-3595, Tumor Biol. Nov. 2015;36: 9015-9022.
Minucci et al., Histone Deacetylase Inhibitors and the Promise of Epigenetic (and more) Treatments for Cancer, Nature Rev Cancer. Jan. 1, 2006;6(1): 38-51.
Mitmaker et al., Modulation of Matrix Metalloproteinase Activity in Human Thyroid Cancer Cell Lines Using Demethylating Agents and Histone Deacetylase Inhibitors, Surgery Apr. 1, 2011;149(4): 504-511.
Miyake et al., Expression of Hypoxia-Inducible Factor-1α, Histone Deacetylase 1, and Metastasis-Associated Protein 1 in Pancreatic Carcinoma: Correlation with Poor Prognosis with Possible Regulation, Pancreas. Apr. 1, 2008;36(3):e 1-9.
Moore et al., Erlotinib Plus Gemcitabine Compared with Gemcitabine Alone in Patients with Advanced Pancreatic Cancer: A Phase III Trial of the National Cancer Institute of Canada Clinical Trials Group, J Clin Oncol. May 20, 2007;25(15): 1960-1966.
Na et al., Effects of the HDAC Inhibitor CG2 in Combination with Irinotecan, 5-Fluorouracil, or Oxaliplatin on HCT116 Colon Cancer Cells and Xenografts, Oncol Rep. Dec. 1, 2010;24(6): 1509-1514.
National Comprehensive Cancer Network [NCCN]—Guidelines in Oncology: Pancreatic Adenocarcinoma, NCCN.org. Version 2. Feb. 25, 2021; 162 pages.
Nixon et al., Prognostic and Predictive Blood-Based Biomarkers in Patients with Advanced Pancreatic Cancer: Results from CALGB80303 (Alliance). Clin Cancer Res. Dec. 15, 2013;19(24): 6957-6966.
O'Connor et al., Belinostat in Patients with Relapsed or Refractory Peripheral T-Cell Lymphoma: Results of the Pivotal Phase II Belief (CLN-19) Study, J Clin Oncol Aug. 10, 2015;33(23): 2492-2499.
Oh et al., Novel Histone Deacetylase Inhibitor CG200745 Induces Clonogenic Cell Death by Modulating Acetylation of p53 in Cancer Cells, Invest New Drugs. Apr. 2012;30: 435-442.
Ono, "Analysis of Salt Selection of Current Active Pharmaceutical Ingredients", The Archives of Practical Pharmacy, vol. 73 No. 3, pp. 176-182, (2013).
Ouaïssi et al., High Histone Deacetylase 7 (HDAC7) Expression is Significantly Associated with Adenocarcinomas of the Pancreas, Anna Surg Oncol. Aug. 2008;15: 2318-2328.
Ouaïssi et al., Further Characterization of HDAC and SIRT Gene Expression Patterns in Pancreatic Cancer and Their Relation to Disease Outcome, PLoS One. Oct. 2, 2014;9(10): e108520; 14 pages.
Petrioli et al., Gemcitabine Plus Nab-Paclitaxel Followed by Maintenance Treatment with Gemcitabine Alone as First-line Treatment for Older Adults with Locally Advanced or Metastatic Pancreatic Cancer, J Geriatr Oncol. May 2020; 11(4): 647-651.
Piacentini et al., Trichostatin A Enhances the Response of Chemotherapeutic Agents in Inhibiting Pancreatic Cancer Cell Proliferation, Virchows Archiv. Jun. 2006;448: 797-804.
Pietrasz et al., Plasma Circulating Tumor DNA in Pancreatic Cancer Patients Is a Prognostic Marker, Clin Cancer Res. Jan. 1, 2017;23(1): 116-123.
Pili et al., Combination of the Histone Deacetylase Inhibitor Vorinostat with Bevacizumab in Patients with Clear-Cell Renal Cell Carcinoma: A Multicentre, Single-Arm Phase I/II Clinical Trial, Br J Cancer Mar. 2017;116(7): 874-883.
Relias et al. Does "Optinab" Strategy ("stop-and-go") Work in Treatment of Advanced Pancreatic Cancer (APC) with Nab-Paclitaxel-Gemcitabine? Cancer Chemother Pharmacol. Aug. 2017; 80(2): 371-375.
Ribatti et al., Epigenetic Control of Tumor Angiogenesis, Microcirc. Apr. 2020:27(3): e12602.
Richards et al., Gemcitabine Plus CI-994 Offers no Advantage Over Gemcitabine Alone in the Treatment of Patients with Advanced Pancreatic Cancer: Results of a Phase II Randomized, Double-Blind, Placebo-Controlled, Multicenter Study, Ann Oncol. Jul. 1, 2006;17(7): 1096-1102.
Ro et al., Abstract LB-359: Extended Accumulation of Acetylated Histone in Tumor Tissues Obtained from the Phase I Study of CG200745, Cancer Res. Apr. 15, 2012;72(8_suppl): LB-359.
Roy et al., Urinary TIMP-1 and MMP-2 Levels Detect the Presence of Pancreatic Malignancies, Br J Cancer. Oct. 2014;111(9): 1772-1779.
Ryan et al., Pancreatic Adenocarcinoma, N Engl J Med 2014; 371(11): 1039-1049.
San-Miguel et al., Panobinostat Plus Bortezomib and Dexamethasone Versus Placebo Plus Bortezomib and Dexamethasone in Patients with Relapsed or Relapsed and Refractory Multiple Myeloma: A Multicentre, Randomised, Double-Blind Phase 3 Trial, The Lancet Oncol. Oct. 1, 2014;15(11):1195-206.
Shin et al., Desmin and CD31 Immunolabeling for Detecting Venous Invasion of the Pancreatobiliary Tract Cancers, PLoS One. Nov. 30, 2020;15(11): e0242571; 19 pages.
Shindo et al., Deleterious Germline Mutations in Patients with Apparently Sporadic Pancreatic Adenocarcinoma, J Clin Oncol. Oct. 20, 2017;35(30): 3382-3390.
Siegel et al., Cancer statistics, 2022, CA Cancer J Clin 71(1): 7-33.
Simon, R., Optimal Two-Stage Designs for Phase II Clinical Trials, Control Clin Trials. Mar. 1, 1989;10(1): 1-10.
Song et al., Discovery of Specific HDAC6 Inhibitor with Anti-Metastatic Effects in Pancreatic Cancer Cells Through Virtual Screening and Biological Evaluation, Bioorg Chem. Apr. 1, 2020;97: 103679; 10 pages.
Suh et al., CG200745, a Novel HDAC Inhibitor, Attenuates Kidney Fibrosis in a Murine Model of Alport Syndrome, Int J Mol Sci Feb. 21, 2020;21(4): 1473; 17 pages.
Sung et al., Histone Deacetylase Inhibitor MGCD0103 Synergizes with Gemcitabine in Human Pancreatic Cells, Cancer Sci. Jun. 2011;102(6): 1201-1207.
Suraweera et al., Combination Therapy with Histone Deacetylase Inhibitors (HDACi) for the Treatment of Cancer: Achieving the Full Therapeutic Potential of HDACi, Front Oncol. Mar. 29, 2018;8: 92; 15 pages.
Takahashi et al., Histone deacetylase inhibitors suppress ACE2 and ABO simultaneously, suggesting a preventive potential against COVID-19. Scientific Reports, vol. 11, No. 3379, pp. 1-9, (2021).
Tala, Satishkumar. (2012). Re: How to make a salt of a novel compound? Retrieved from: https://www.researchgate.net/post/How_to_make_a_salt_of_a_novelcompound2/5055c397e24a461b02000022/citation/download; 3 pages.
Tamura et al., Induction of IGFBP-1 Expression by cAMP is Associated with Histone Acetylation Status of the Promoter Region in Human Endometrial Stromal Cells, Endocrinol. Nov. 1, 2012;153(11): 5612-5621.

(56) References Cited

OTHER PUBLICATIONS

Von Hoff et al., Increased Survival in Pancreatic Cancer with Nab-Paclitaxel Plus Gemcitabine, N Engl J Med 2013; 369(18): 1691-1703.
Wang et al., Phase II Study of Panobinostat and Bortezomib in Patients with Pancreatic Cancer Progressing on Gemcitabine-Based Therapy, Anticanc Res. Mar. 1, 2012;32(3): 1027-1031.
Wei et al., Monitoring Tumor Burden in Response to Folfirinox Chemotherapy Via Profiling Circulating Cell-Free DNA in Pancreatic Cancer, Mol Cancer Thera. Jan. 1, 2019;18(1): 196-203.
Wiedmann et al., Pharmaceutical salts: Theory, used in solid dosage forms and in situ preparation in an aerosol, Asian Journal of Pharmaceutical Sciences, vol. 11, pp. 722-734, (2016).
Zhang et al., Yin Yang-1 Suppresses Invasion and Metastasis of Pancreatic Ductal Adenocarcinoma by Downregulating MMP10 in a MUC4/ErbB2/p38/MEF2C-Dependent Mechanism, Mol Cancer. Dec. 2014;13: 130; 17 pages.
Zhang et al., Characterization of a Dual BET/HDAC Inhibitor for Treatment of Pancreatic Ductal Adenocarcinoma, Int J Cancer. Nov. 15, 2020;147(10): 2847-2861.
International Search Report and Written Opinion dated Feb. 7, 2020, for International Application No. PCT/KR2019/014234.
Berge et al., "Pharmaceutical Salts". J Pharm Sci. Jan. 1977;66(1): 1-19.
Drugbank Online, Ivaltinostat phosphate, Accession #DB17118, (Year: 2022) downloaded from URL: https://go.drugbank.com/drugs/DB17118 in 5 pages.
Hwang et al., A novel histone deacetylase inhibitor, CG20006, induces cell death through both extrinsic and intrinsic apoptotic pathways. Anti-Cancer Drugs. Oct. 1, 2009;20(9): 815-821.
Hwang et al., A novel histone deacetylase inhibitor, CG200745, potentiates anticancer effect of docetaxel in prostate cancer via decreasing Mcl-1 and Bcl-XL. Invest New Drugs. Aug. 2012;30: 1434-1442.
Baek et al., Combination Therapy with Polmacoxib and Ivaltinostat as a Novel Strategy for Rheumatoid Arthritis Treatment. Presentation at Korean Association of Immunologist 2023 Spring Academic Conference; Apr. 13-14, 2023; Abstract, Poster# PP-027, and Press Release; https://www.hankyung.com/article/202304172834i in 7 pages.
Fasinu et al., Diverse Approaches for the Enhancement of Oral Drug Bioavailability. Biopharma Drug Disp. May 2011;32(4):185-209.
Fountzilas et al., A Randomized, Multi-Center, Phase 2 Study of Ivaltinostat Plus Capecitabine Versus Capecitabine Alone in the Maintenance Setting in Patients with Metastatic Pancreatic Adenocarcinoma (mPDAC); Presentation at 2024 ASCO Annual Meeting held May 31-Jun. 4, 2024, Chicago, IL; Abstract #TPS4206 & Poster in 2 pages.
Kim et al., The Anti-fibrotic Effects of CG-745, an HDAC Inhibitor, in Bleomycin and PHMG-induced Mouse Models. Molecules. Jul. 31, 2019;24(15):2792 in 13 pages.
Kim et al., HDAC Inhibitor, CG-745, Enhances the Anti-Cancer Effect of Anti-PD-I Immune Checkpoint Inhibitor by Modulation of the Immune Microenvironment. J Cancer. Apr. 6, 2020;11(14):4059 in 14 pages.
Kim et al., Pharmacokinetics and Pharmacodynamics of IV and Oral Formulations of CG-745 After a Single Administration in Healthy Korean Subjects. Euro J Clin Pharma. S35-36; In Presentation at 2022 European Association for Clinical Pharmacology and Therapeutics (EACPT) Annual Meeting on Jun. 26, 2022; Abstract & Poster in 4 pages.
Okusaka et al., Immunotherapy for Hepatocellular Carcinoma: Current Status and Future Perspectives. ESMO open. Jan. 1, 2018;3:e000455 in 6 pages.
Walker et al., A Phase 1b/2, dose escalation, randomized, multi-center study of maintenance (maint) ivaltinostat (ival) plus capecitabine (cap) or capecitabine monotherapy in patients (pts) with metastatic pancreatic adenocarcinoma (PDAC) whose disease has not progressed on first-line Folfirinoxx chemotherapy (CT). Presentation at 2022 ASCO Annual Meeting held Jun. 3-7, 2022; Abstract #TPS4181 & Poster in 2 pages.
Walker et al., Results of the Safety and Tolerability of Ivaltinostat plus Capecitabine in the Phase 1b Portion of A Phase 1b/2, Dose-escalation, Randomized, Multi-center Study in the Maintenance (maint) Setting in Patients with Metastatic Pancreatic Adenocarcinoma (PDAC). Presentation at 2024 ASCO GI Meeting held Jan. 19, 2024, San Francisco, CA; Abstract #666 & Poster in 2 pages.

* cited by examiner

IVALTINOSTAT COMBINATION THERAPY FOR TREATING PANCREATIC CANCER

INCORPORATION BY REFERENCE TO ANY PRIORITY APPLICATIONS

The present application claims the benefit of priority to U.S. Ser. No. 63/505,608, filed Jun. 1, 2023, which is incorporated by reference in its entirety.

BACKGROUND

Pancreatic ductal adenocarcinoma (PDAC) is currently the third-leading cause of cancer-related mortality in the US and is expected to rise to the second-leading cause by 2030 (Siegel R L, et al., Cancer statistics, 2021, CA Cancer J Clin 71:7-33). Almost 90% of patients are diagnosed with inoperable disease (Ryan D P et al., Pancreatic Adenocarcinoma. N Engl J Med 2014; 371:1039-1049) and most have distant metastases at presentation, for which the current expected 5-year survival is only 3%.

The mainstay of treatment for metastatic PDAC is cytotoxic chemotherapy. For patients who can tolerate aggressive treatment (e.g., ECOG Performance Status 0-1), Phase 3 data support FOLFIRINOX and gemcitabine with nanoparticle albumin-bound paclitaxel (nab-paclitaxel) as the most effective first line regimens. In the PRODIGE 4/ACCORD 11 trial (Conroy T et al., FOLFIRINOX versus gemcitabine for metastatic pancreatic cancer, N Engl J Med 2011; 364:1817-1825), FOLFIRINOX produced median progression-free survival (PFS) of 6.4 months and overall survival (OS) 11.1 months. In the MPACT trial (Von Hoff D D et al., Increased survival in pancreatic cancer with nab-paclitaxel plus gemcitabine, N Engl J Med 2013; 369:1691-1703), gemcitabine/nab-paclitaxel produced median PFS 5.5 months and median OS 8.5 months. Both regimens, in their respective trials, statistically significantly improved survival compared to gemcitabine monotherapy, the prior standard of care.

First line chemotherapy for metastatic PDAC is generally continued until disease progression or development of intolerable adverse effects, with patients often reaching a plateau in response after 4-6 months. For patients with responsive or stable disease after first line therapy, the appropriate maintenance treatment strategy is undefined.

The only reported Phase 3 study to explore PDAC maintenance therapy, the POLO trial, showed that the PARP inhibitor olaparib improved PFS compared to placebo among patients with germline BRCA1/2 (gBRCA) mutations after ≥16 weeks of platinum-based therapy (median PFS 7.4 vs. 3.8 months; HR 0.53, p=0.004) (Golan T et al., Maintenance olaparib for germline BRCA-mutated metastatic pancreatic cancer, N Engl J Med, 2019 25; 381 (4): 317-327). However, the use of placebo as a control arm does not accurately represent current clinical practice. Moreover, only 1-2% of individuals with PDAC harbor gBRCA mutations (Shindo K et al., Deleterious Germline Mutations in Patients With Apparently Sporadic Pancreatic Adenocarcinoma, J Clin Oncol. 2017 Oct. 20; 35 (30): 3382-3390) leaving unresolved the question of the optimal maintenance approach for non-biomarker-selected patients.

For at least the foregoing reasons, there is a need for improved treatment methods for pancreatic cancer, including untreated locally advanced or metastatic PDAC. Additionally, there is a need for predictive biomarkers for effectiveness of ivaltinostat, that may be correlated with clinical outcomes for pancreatic cancer. Such biomarkers may advantageously provide an indication that a treatment may provide a benefit for maintenance therapies, and therefore justify any associated toxicities.

SUMMARY

One aspect of the present application relates to a method of providing pancreatic cancer treatment to a subject in need thereof, comprising: determining or receiving information on a baseline expression level of one or more serological protein biomarkers selected from the group consisting of TIMP1, pro-MMP10, and PECAM1 (CD31) in the subject prior to the treatment; administering an effective amount of ivaltinostat in combination with one or more anti-cancer agents to the subject; and predicting or determining the subject's response to the pancreatic cancer treatment. In some embodiments, the method further comprises adjusting pancreatic cancer treatment based on the subject's response to the treatment.

Another aspect of the present application relates to a method of treating pancreatic cancer in a subject in need thereof, comprising: receiving information on a subject's serological protein biomarker TIMP1 expression level prior to the treatment; selecting the subject with a TIMP1 expression level of about 200 ng/ml or less; and administering an effective amount of ivaltinostat in combination with one or more anti-cancer agents to the subject. In some embodiments, the method comprises selecting the subject with the TIMP1 expression level of about 100 ng/ml or less.

Another aspect of the present application relates to a method of treating pancreatic cancer in a subject in need thereof, comprising: receiving information on a subject's serological protein biomarker pro-MMP10 expression level prior to the treatment; selecting the subject with a pro-MMP10 expression level of about 500 pg/mL or less; and administering an effective amount of ivaltinostat in combination with one or more anti-cancer agents to the subject. In some embodiments, the method comprises identifying or selecting the subject with the pro-MMP10 expression level of about 300 pg/mL or less.

A further aspect of the present application relates to a method of treating pancreatic cancer in a subject in need thereof, comprising: receiving information on a subject's serological protein biomarker PECAM1 (CD31) expression level prior to the treatment; selecting the subject with a PECAM1 expression level of about 7.5 ng/ml or less; and administering an effective amount of ivaltinostat in combination with one or more anti-cancer agents to the subject. In some embodiments, the method comprises selecting the subject with the PECAM1 expression level of about 6 ng/ml or less.

In some embodiments of the methods described herein, the serological protein biomarker TIMP1, pro-MMP10 or PECAM1 has a negative correlation with progression-free survival (PFS). In some embodiments, the subject has a PFS of at least 3, 4, 5, 6, 7, 8, 9, 10, 11 or 12 months. In some embodiments, the serological protein biomarker is a mutation burden detectable by cfDNA analysis.

In some embodiments of the methods described herein, the effective amount of ivaltinostat is about 10 mg/m$^2$ to about 250 mg/m$^2$. In further embodiments, the effective amount of ivaltinostat is about 60 mg/m$^2$, about 125 mg/m$^2$, or about 250 mg/m$^2$. In some embodiments, ivaltinostat is administered by intravenous infusion. In some embodiments, the intravenous infusion is over about 30 minutes to about 120 minutes, about 50 minutes to about 70 minutes, or about 60 minutes. In some other embodiments, ivaltinostat is administered orally. In some embodiments, ivaltinostat is administered on day 1, day 8, and day 15 of each 28-day (4 week) cycle. In other embodiments, ivaltinostat is administered on day 1 and day 8 of each 21-day (3 week) cycle. In some embodiments, the treatment is repeated at least 3, 4, 5, 6, 7, 8, 9, or 10 cycles.

In some embodiments of the methods described herein, the one or more additional anti-cancer agents comprises gemcitabine or erlotinib, or a combination thereof. In some further embodiments, the one or more additional anti-cancer agents are gemcitabine and erlotinib. In some such embodiments, the effective amount of gemcitabine is about 500 mg/m$^2$ to about 2000 mg/m$^2$, about 750 mg/m$^2$ to about 1500 mg/m$^2$, or about 1000 mg/m$^2$. In some further embodiments, gemcitabine is administered by intravenous infusion once per week for 3 weeks in each 28-day (4 week) cycle. In some other embodiments, gemcitabine is administered by intravenous infusion once per week for 2 weeks in each 21-day (3 week) cycle. In some such embodiments, the effective amount of erlotinib is about 50 mg to about 200 mg, about 75 mg to about 150 mg, or about 100 mg. In some further embodiments, erlotinib is administered orally one, two, three or four times daily in each cycle of the treatment.

In some embodiments of the methods described herein, the one or more additional anti-cancer agents comprises or is capecitabine. In some such embodiments, capecitabine is administered in an amount from about 200 mg/m$^2$ to about 2000 mg/m$^2$, from about 500 mg to about 1500 mg/m$^2$, or from about 750 mg/m$^2$ to about 1250 mg/m$^2$, or about 1000 mg/m$^2$. In some embodiments, capecitabine is for oral administration once or twice daily on days 1-21 of each 28-day (4 week) cycle. In other embodiments, capecitabine is for oral administration once or twice daily on days 1-14 of each 21-day (3 week) cycle.

In some embodiments of the methods described herein, the subject is administered about 250 mg/m$^2$ ivaltinostat by intravenous infusion on day 1, day 8, and day 15 of each 28-day (4 week) cycle, in combination with about 100 mg/m$^2$ gemcitabine by intravenous infusion once per week for 3 weeks in each 28-day (4 week) cycle and about 100 mg/day erlotinib orally daily. In some further embodiments, the subject is treated for at least 6 cycles.

In some embodiments of the methods described herein, the subject is administered about 60 to 250 mg/m$^2$ ivaltinostat by intravenous infusion on day 1 and day 8 of each 21-day (3 week) cycle, in combination with 1000 mg/m$^2$ capecitabine orally twice daily on days 1 to 14 of each 21-day cycle. In some such embodiments, the subject is treated for at least 10 cycles.

In some embodiments of the methods described herein, the pancreatic cancer is pancreatic adenocarcinoma, also referred to as pancreatic ductal pancreatic ductal adenocarcinoma (PDAC). In some such embodiments, the pancreatic adenocarcinoma is untreated locally advanced. In other embodiments, the pancreatic adenocarcinoma is metastatic. In further embodiments, the subject has been treated with a first line fluoropyrimidine-based chemotherapy, such as a FOLFIRINOX chemotherapy regimen (an abbreviation for a chemotherapy combination used to treat pancreatic cancer that has spread to other parts of the body. It may include but is not limited to the drugs leucovorin calcium, fluorouracil, irinotecan hydrochloride, and oxaliplatin). In further embodiments, the subject has been treated with a FOLFIRINOX chemotherapy regimen. In still further embodiments, the subject has metastatic pancreatic adenocarcinoma and the subject has a response or stability with the first line fluoropyrimidine-based chemotherapy. In still further embodiments, the subject has metastatic pancreatic adenocarcinoma whose disease has not progressed on a first line fluoropyrimidine-based chemotherapy.

BRIEF DESCRIPTION OF THE DRAWINGS

FIG. 2(A) shows overall survival according to study populations, and FIG. 2(B) shows progression-free survival according to study populations.

FIG. 4(A) demonstrates a correlation between blood markers and progression-free survival (PFS) of patients is illustrated as a scatter plot where each dot represents a single blood sample. Pearson's correlation values (R) and the p-values are indicated. FIG. 4(B) shows the modulation of blood markers in good and poor responders according to PFS.

DETAILED DESCRIPTION

Figure 1:
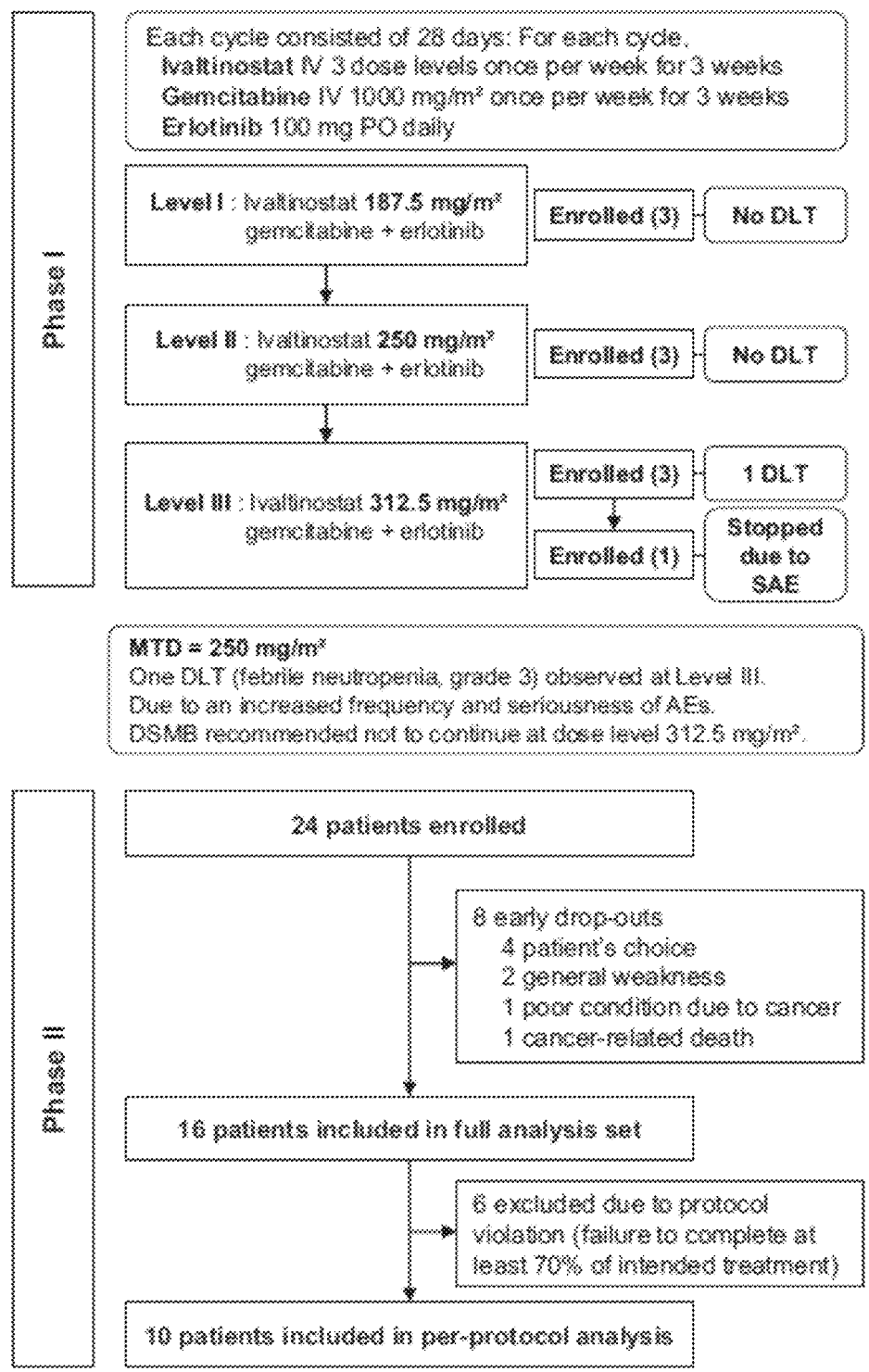
FIG. 1 illustrates a trial flow of the Phase I and II study as described herein in Example 1.

Ivaltinostat (E)-N1-(3-(dimethylamino) propyl)-N8-hydroxy-2-((naphthalen-1-yloxy)methyl)oct-2-enediamide phosphate is an anticancer therapeutic candidate that inhibits enzymatic activity of histone deacetylase (HDAC).

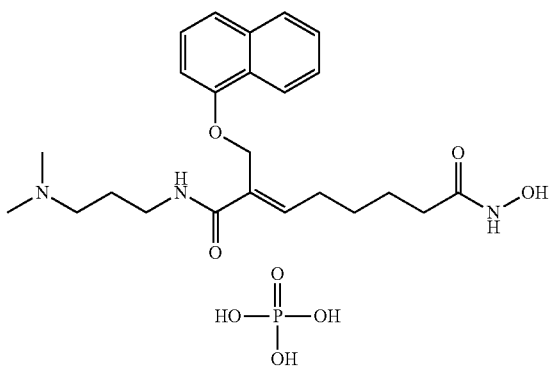

Histone acetylation/deacetylation is an integral component of epigenetic regulation mechanisms in human cells. This process is mediated by counterbalanced enzymes: histone acetyltransferase (HAT), which adds acetyl groups to, and histone deacetylase (HDAC), which removes the acetyl groups from lysine residues present at the N-terminus of histones and other proteins. Acetylation neutralizes the positive charge on histones, unwrapping DNA from the nucleosome, opening chromatin, and leading to increased gene transcription. The balance between HDAC and HAT activity can modulate gene expression in response to changes in the molecular environment.

Essential processes such as cell proliferation, migration, angiogenesis, DNA damage repair, and death depend on coordinated HDAC/HAT activity, histone modification, nucleosome remodeling, and gene transcription. Aberrant epigenetic regulation due to HDAC overactivity can cause tumor suppressor gene silencing and neoplastic cell transformation. Indeed, HDAC overexpression has been detected in wide range of cancers.

The reversible nature of epigenetic modification creates a therapeutic opportunity to restore normal gene expression in malignant cells by inhibiting HDAC activity. In pre-clinical studies, HDAC inhibition has been shown to limit tumor growth and angiogenesis, control tumor differentiation, and induce DNA damage, cell cycle arrest, apoptosis and autophagy. HDAC inhibitors (HDACi) sensitize tumor cells to chemotherapy and radiation and can influence anti-tumoral immune responses to overcome immunotherapeutic resistance.

HDAC enzymes are overexpressed in PDAC cells and are implicated in oncogenesis as well as tumor progression. In preclinical studies, HDAC were found to regulate PDAC cell mobility/migration and confer chemotherapeutic resistance. In humans, HDAC expression in PDAC surgical resection specimens correlates with worse prognosis. HDAC inhibition thus represents an appealing therapeutic approach, either as monotherapy or as an adjunct to established treatments.

After first line fluoropyrimidine-based therapy, most commonly oxaliplatin, irinotecan, leucovorin, and 5-fluorouracil (FOLFIRINOX), the optimal maintenance treatment for advanced pancreatic adenocarcinoma is undefined. Simplifying a multi-agent regimen to fluoropyrimidine monotherapy is a common practice for maintenance treatment, and the oral fluoropyrimidine, capecitabine, is commonly used to maximize convenience. Capecitabine is labeled for monotherapy for the treatment of adjuvant Dukes' C colon cancer and metastatic colon cancer at a recommended dose of 1250 mg/m$^2$ twice daily for 2 weeks followed by a 1-week rest. This dose schedule was effective and tolerable in the first line setting for patients with pancreatic cancer (Cartwright, J Clin Oncol 2002 Jan. 1; 20 (1): 160-1642002).

Other useful pharmaceutical salt of ivaltinostat free base (E)-N1-(3-(dimethylamino)propyl)-N8-hydroxy-2-((naphthalen-1-yloxy)methyl)oct-2-enediamide include other acid addition salts, such as tartaric acid addition salt, which is disclosed in WO 2018/230829 and U.S. Publication No. 2020/0283371 A1, each of which is incorporated by reference in its entirety. In addition to the phosphate salt, other pharmaceutically acceptable salt of ivaltinostat free base may also be used in the methods described herein.

Some embodiments of the disclosure relate to methods for identifying a cancer patient who is (a) likely to, or (b) less likely to, respond to treatment with ivaltinostat. In some embodiments, the methods comprise the step of determining the pretreatment level of one or more specific blood biomarkers that are negatively correlated with PFS or overall survival. In certain embodiments, the biomarker may be a mutation burden detected by cfDNA or specific blood biomarkers. In some embodiments, the specific blood biomarkers comprise TIMP1, pro-MMP10, or PECAM1. In some embodiments, the determination of the pretreatment level of the specific blood biomarkers includes: obtaining or having obtained a blood sample from the patient; and performing or having performed a genotyping assay on the blood sample to determine if the patient has the specific biomarkers; and if the patient has the specific biomarker, the expression level of the specific biomarker.

Definitions

The section headings used herein are for organizational purposes only and are not to be construed as limiting the subject matter described.

Unless defined otherwise, all technical and scientific terms used herein have the same meaning as is commonly understood by one of ordinary skill in the art. The use of the term "including" as well as other forms, such as "include", "includes," and "included," is not limiting. The use of the term "having" as well as other forms, such as "have", "has," and "had," is not limiting. As used in this specification, whether in a transitional phrase or in the body of the claim, the terms "comprise(s)" and "comprising" are to be interpreted as having an open-ended meaning. That is, the above terms are to be interpreted synonymously with the phrases "having at least" or "including at least." For example, when used in the context of a process, the term "comprising" means that the process includes at least the recited steps, but may include additional steps. When used in the context of a compound, composition, formulation, or device, the term "comprising" means that the compound, composition, formulation, or device includes at least the recited features or components, but may also include additional features or components.

The terms "effective amount" and "therapeutically effective amount" are broad terms, and are to be given their ordinary and customary meaning to a person of ordinary skill in the art (and are not to be limited to a special or customized meaning), and refer without limitation to a sufficient amount of an agent or a compound being administered which will relieve to some extent one or more of the symptoms of the disease or condition being treated. The result can be reduction and/or alleviation of the signs, symptoms, or causes of a disease, or any other desired alteration of a biological system. For example, an "effective amount" for therapeutic uses is the amount of the composition comprising a compound as disclosed herein required to provide a clinically significant decrease in disease symptoms. An appropriate "effective" amount in any individual case may be determined using techniques, such as a dose escalation study. Where a drug has been approved by the U.S. Food and Drug Administration (FDA) or a counterpart foreign medicines agency, a "therapeutically effective amount" optionally refers to the dosage approved by the FDA or its counterpart foreign agency for treatment of the identified disease or condition.

"Treat," "treatment," or "treating," as used herein refers to administering a pharmaceutical composition/formulation for prophylactic and/or therapeutic purposes. The term "prophylactic treatment" refers to treating a patient who is not yet suffering from a disease, but who is susceptible to, or otherwise at risk of, a particular disease, whereby the treatment reduces the likelihood that the patient will develop a disease. The term "therapeutic treatment" refers to administering treatment to a patient already suffering from a disease.

The terms "co-administration" or "combination therapy" as used herein means that the additional therapeutic agent(s) may be administered together with ivaltinostat, as part of a single dosage form (such as a composition of this disclosure comprising a compound of the disclosure and additional therapeutic agent(s) or as separate, multiple dosage forms. Alternatively, the additional therapeutic agent(s) may be administered prior to, consecutively with, or following the administration of ivaltinostat.

The term "pharmaceutically acceptable salt" as used herein is a broad term, and is to be given its ordinary and customary meaning to a person of ordinary skill in the art (and is not to be limited to a special or customized meaning), and refers without limitation to a salt of a compound that does not cause significant irritation to an organism to which it is administered and does not abrogate the biological activity and properties of the compound. In some embodiments, the salt is an acid addition salt of the compound. Pharmaceutical salts can be obtained by reacting a compound with inorganic acids such as hydrohalic acid (e.g., hydrochloric acid or hydrobromic acid), sulfuric acid, nitric acid, and phosphoric acid. Pharmaceutical salts can also be obtained by reacting a compound with an organic acid such as aliphatic or aromatic carboxylic or sulfonic acids, for example formic acid, acetic acid (AcOH), propionic acid, glycolic acid, pyruvic acid, malonic acid, maleic acid, fumaric acid, trifluoroacetic acid (TFA), benzoic acid, cinnamic acid, mandelic acid, succinic acid, lactic acid, malic acid, tartaric acid, citric acid, ascorbic acid, nicotinic acid, methanesulfonic acid, ethanesulfonic acid, p-toluensulfonic acid, salicylic acid, stearic acid, muconic acid, butyric acid, phenylacetic acid, phenylbutyric acid, valproic acid, 1,2-ethanedisulfonic acid, 2-hydroxyethanesulfonic acid, benzenesulfonic acid, 2-naphthalenesulfonic acid, or naphthalenesulfonic acid. Pharmaceutical salts can also be obtained by reacting a compound with a base to form a salt such as an ammonium salt, an alkali metal salt, such as a lithium, sodium or a potassium salt, an alkaline earth metal salt, such as a calcium, magnesium or aluminum salt, a salt of organic bases such as dicyclohexylamine, N-methyl-D-glucamine, tris(hydroxymethyl)methylamine, (C1-C7 alkyl)amine, cyclohexylamine, dicyclohexylamine, triethanolamine, ethylenediamine, ethanolamine, diethanolamine, triethanolamine, tromethamine, and salts with amino acids such as arginine and lysine; or a salt of an inorganic base, such as aluminum hydroxide, calcium hydroxide, potassium hydroxide, sodium carbonate, sodium hydroxide, or the like.

The term "progression-free survival" (PFS) as used herein is a broad term, and is to be given its ordinary and customary meaning to a person of ordinary skill in the art (and is not to be limited to a special or customized meaning), and refers without limitation the length of time during and after the treatment of a disease, such as cancer, that a patient lives with the disease but it does not get worse. In a clinical trial, measuring the PFS is one way to see how well a new treatment works.

It is understood that the compounds described herein can be labeled isotopically or by another other means, including, but not limited to, the use of chromophores or fluorescent moieties, bioluminescent labels, or chemiluminescent labels. Substitution with isotopes such as deuterium may afford certain therapeutic advantages resulting from greater metabolic stability, such as, for example, increased in vivo half-life or reduced dosage requirements. Each chemical element as represented in a compound structure may include any isotope of said element. For example, in a compound structure a hydrogen atom may be explicitly disclosed or understood to be present in the compound. At any position of the compound that a hydrogen atom may be present, the hydrogen atom can be any isotope of hydrogen, including but not limited to hydrogen-1 (protium), hydrogen-2 (deuterium), and hydrogen-3 (tritium). Thus, reference herein to a compound encompasses all potential isotopic forms unless the context clearly dictates otherwise.

Pharmaceutical Compositions

Ivaltinostat as described herein may be provided for administration in the form of a pharmaceutical composition, include an effective amount of ivaltinostat or a pharmaceutically acceptable salt, such as phosphate salt, and at least one pharmaceutically acceptable excipient or carrier.

The term "pharmaceutical composition" refers to a mixture of one or more compounds and/or salts disclosed herein with other chemical components, such as one or more excipients. The pharmaceutical composition facilitates administration of the compound to an organism. Pharmaceutical compositions will generally be tailored to the specific intended route of administration.

As used herein, an "excipient" refers to essentially inert substances that are added to a pharmaceutical composition to provide, without limitation, bulk, consistency, stability, binding ability, lubrication, disintegrating ability etc., to the composition. For example, stabilizers such as antioxidants and metal-chelating agents are excipients. Excipients also include ingredients in a pharmaceutical composition that lack appreciable pharmacological activity but may be pharmaceutically necessary or desirable. For example, to increase the bulk of a potent drug whose mass is too small for manufacture and/or administration. It may also be a liquid for the dissolution of a drug to be administered by injection, ingestion or inhalation. For example, a buffered aqueous solution such as, without limitation, phosphate buffered saline that mimics the pH and isotonicity of human blood.

The pharmaceutical compositions described herein can be administered to a human patient per se, or in pharmaceutical compositions where they are mixed with other active ingredients, as in combination therapy, or excipients, or combinations thereof. Proper formulation is dependent upon the route of administration chosen. Techniques for formulation and administration of the compounds described herein are known to those skilled in the art.

The pharmaceutical compositions disclosed herein may be manufactured in a manner that is itself known, e.g., by means of conventional mixing, dissolving, granulating, dragee-making, levigating, emulsifying, encapsulating, entrapping or tableting processes. Additionally, the active ingredients (e.g., ivaltinostat and one or more additional anticancer agents) are contained in an amount effective to achieve its intended purpose.

Multiple techniques of administering a pharmaceutical composition exist in the art including, but not limited to, oral, rectal, pulmonary, topical, aerosol, injection, infusion and parenteral delivery, including intramuscular, subcutaneous, intravenous, intramedullary injections, intrathecal, direct intraventricular, intraperitoneal, intranasal and intraocular injections. In some embodiments, a pharmaceutical composition of ivaltinostat may be administered intravenously. In some other embodiments, a pharmaceutical composition of ivaltinostat may be administered orally.

The compositions may, if desired, be presented in a pack or dispenser device which may contain one or more unit dosage forms containing the active ingredient. The pack may for example comprise metal or plastic foil, such as a blister pack. The pack or dispenser device may be accompanied by instructions for administration. The pack or dispenser may also be accompanied with a notice associated with the container in form prescribed by a governmental agency regulating the manufacture, use, or sale of pharmaceuticals, which notice is reflective of approval by the agency of the form of the drug for human or veterinary administration. Such notice, for example, may be the labeling approved by the U.S. Food and Drug Administration for prescription drugs, or the approved product insert. Pharmaceutical Compositions as described herein formulated in a compatible pharmaceutical excipient may also be prepared, placed in an appropriate container, and labeled for treatment of an indicated condition. For ivaltinostat combination therapy, the pharmaceutical composition comprising ivaltinostat may be separate from a pharmaceutical composition containing the one or more additional therapeutic agents (e.g., one or more anti-cancer agents. For example, the pharmaceutical composition containing ivaltinostat is for administration by IV while the pharmaceutical composition containing the additional anti-cancer agent(s) is for administration by a different route of administration (e.g., orally). In some such embodiments, the pharmaceutical composition of ivaltinostat may be separately packaged with the additional therapeutical agent(s) in a kit or marketed separately as two individual products. In other embodiments, the pharmaceutical composition containing ivaltinostat is administered by the same route as that of the pharmaceutical composition containing the additional anti-cancer agent(s). As such, ivaltinostat and the additional anti-cancer agent(s) may be in a single unit dosage form, or may be adapted to be administered together.

Methods of Treating Pancreatic Cancer

One aspect of the present application relates to a method of providing pancreatic cancer treatment to a subject in need thereof, comprising: determining or receiving information on a baseline expression level of one or more serological protein biomarkers selected from the group consisting of TIMP1, pro-MMP10, and PECAM1 (CD31) in the subject prior to the treatment; administering an effective amount of ivaltinostat in combination with one or more anti-cancer agents to the subject; and predicting or determining the subject's response to the pancreatic cancer treatment. In some embodiments, the method further comprises adjusting pancreatic cancer treatment based on the subject's response to the treatment, including but not limited to increase or decrease of the amount of ivaltinostat and/or one or more additional anti-cancer agents, or stopping the current therapy.

Another aspect of the present application relates to a method of treating pancreatic cancer in a subject in need thereof, comprising: receiving information on a subject's serological protein biomarker TIMP1 expression level prior to the treatment; selecting the subject with a TIMP1 expression level of about 200 ng/ml or less; and administering an effective amount of ivaltinostat in combination with one or more anti-cancer agents to the subject. In some embodiments, the method comprises selecting the subject with the TIMP1 expression level of about 190 ng/ml, 180 ng/ml, 170 ng/mL, 160 ng/ml, 150 ng/ml, 140 ng/ml, 130 ng/ml, 120 ng/ml, 110 ng/ml, or 100 ng/ml or less.

Another aspect of the present application relates to a method of treating pancreatic cancer in a subject in need thereof, comprising: receiving information on a subject's serological protein biomarker pro-MMP10 prior to the treatment; selecting the subject with a pro-MMP10 expression level of about 500 pg/mL or less; and administering an effective amount of ivaltinostat in combination with one or more anti-cancer agents to the subject. In some embodiments, the method comprises identifying or selecting the subject with the pro-MMP10 expression level of about 450 pg/mL, 400 pg/mL, 350 pg/mL, 300 pg/mL, 250 pg/mL, 200 pg/mL, 150 pg/mL or 100 pg/mL or less.

A further aspect of the present application relates to a method of treating pancreatic cancer in a subject in need thereof, comprising: receiving information on a subject's serological protein biomarker PECAM1 (CD31) prior to the treatment; selecting the subject with a PECAM1 expression level of about 7.5 ng/ml or less; and administering an effective amount of ivaltinostat in combination with one or more anti-cancer agents to the subject. In some embodiments, the method comprises selecting the subject with the PECAM1 expression level of about 7 ng/ml, 6.5 ng/ml, 6 ng/ml, 5.5 ng/ml, 5 ng/ml, 4.5 ng/ml, 4 ng/mL, 3.5 ng/ml, 3 ng/mL, 2.5 ng/mL, 2 ng/ml, 1.5 ng/ml, or 1 ng/ml or less.

In some embodiments of the method described herein, the serological biomarker measurement is performed using an ELISA analysis.

In some embodiments of the methods described herein, the serological protein biomarker TIMP1, pro-MMP10 or PECAM1 has a negative correlation with progression-free survival (PFS). In some embodiments, the Pearson's correlation value R for the negative correlation between TIMP1 with PFS is between about −0.5 to about −1. In some embodiments, the Pearson's correlation value R for the negative correlation between pro-MMP10 with PFS is between about −0.6 to about −1. In some embodiments, the Pearson's correlation value R for the negative correlation between PECAM1 with PFS is between about −0.6 to about −1. In some embodiments, the subject has a PFS of at least 3, 3.5, 4, 4.5, 5, 5.5, 6, 6.5, 7, 7.5, 8, 8.5, 9, 9.5, 10, 10.5, 11, 11.5 or 12 months. In some embodiments, the subject has an overall survival (OS) of at least 3, 3.5, 4, 4.5, 5, 5.5, 6, 6.5, 7, 7.5, 8, 8.5, 9, 9.5, 10, 10.5, 11, 11.5 or 12 months. In some embodiments, the serological protein biomarker is a mutation burden detectable by cfDNA analysis.

In some embodiments of the methods described herein, the effective amount of ivaltinostat is about 10 mg/m$^2$ to about 250 mg/m$^2$, for example, about 10, 20, 30, 40, 50, 60, 70, 80, 90, 100, 125, 150, 175, 200, 225, or 250 mg/m$^2$. In further embodiments, the effective amount of ivaltinostat is about 60 mg/m$^2$, about 125 mg/m$^2$, or about 250 mg/m$^2$. In some embodiments, ivaltinostat is administered by intravenous infusion. In some embodiments, the intravenous infusion is over about 30 minutes to about 120 minutes, about 50 minutes to about 70 minutes, or about 60 minutes. In some other embodiments, ivaltinostat is administered orally.

In some embodiments of the method described herein, ivaltinostat is administered on day 1, day 8, and day 15 of each 28-day (4 week) cycle. In some such embodiments, ivaltinostat is administered via intravenous infusion in an amount of about 60 mg/m$^2$, about 125 mg/m$^2$, or about 250 mg/m$^2$. In some such embodiments, the treatment is repeated for at least 3, 4, 5 or 6 cycles. In one embodiment, the treatment is repeated for 6 cycles.

In some other embodiments of the method described herein, ivaltinostat is administered on day 1 and day 8 of each 21-day (3 week) cycle. In some such embodiments, ivaltinostat is administered orally in an amount of from about 60 mg/m$^2$ to about 250 mg/m$^2$, or about 60 mg/m$^2$, or about 125 mg/m$^2$, or about 250 mg/m$^2$. In some embodiments, the treatment is repeated at least 3, 4, 5, 6, 7, 8, 9, or 10 cycles. In one embodiment, the treatment is repeated for 10 cycles.

In some embodiments of the methods described herein, the one or more additional anti-cancer agents comprises gemcitabine or erlotinib, or a combination thereof. In some further embodiments, the one or more additional anti-cancer agents are gemcitabine and erlotinib. In some such embodiments, the effective amount of gemcitabine is about 500 mg/m$^2$ to about 2000 mg/m$^2$, about 750 mg/m$^2$ to about 1500 mg/m$^2$, or about 1000 mg/m$^2$. In some further embodiment, the amount of gemcitabine administered is about 500, 550, 600, 650, 700, 750, 800, 850, 900, 950, 1000, 1050, 1100, 1150, 1200, 1250, 1300, 1350, 1400, 1450, 1500, 1550, 1600, 1650, 1700, 1750, 1800, 1850, 1900, 1950, or 2000 mg/m$^2$, or a range defined by any two of the preceding values. In one embodiment, the amount of gemcitabine administered is 1000 mg/m$^2$. In further embodiments, gemcitabine is administered by intravenous infusion every week. In some further embodiments, gemcitabine is administered by intravenous infusion once per week for the first three weeks in each 28-day (4 week) cycle. In some other embodiments, gemcitabine is administered by intravenous infusion once per week for the first two weeks in each 21-day (3 week) cycle. In some embodiments, the effective amount of erlotinib is about 50 mg to about 200 mg, about 75 mg to about 150 mg, or about 100 mg. In some further embodiments, the amount of erlotinib administered is about 50, 55, 60, 65, 70, 75, 80, 85, 90, 95, 100, 110, 120, 130, 140, 150, 160, 170, 180, 190 or 200 mg, or a range defined by any two of the preceding values. In one embodiment, the amount of erlotinib administered is about 100 mg. In further embodiments, erlotinib is administered orally one, two, three or four times a day. In one example, erlotinib is administered 4 times a day with a daily dose of 100 mg. In some further embodiments, erlotinib is administered orally one, two, three or four times daily in each cycle of the treatment.

In some embodiments of the methods described herein, the one or more additional anti-cancer agents comprises or is capecitabine. In some such embodiments, capecitabine is administered in an amount from about 200 mg/m$^2$ to about 2000 mg/m$^2$, from about 500 mg to about 1500 mg/m$^2$, or from about 750 mg/m$^2$ to about 1250 mg/m$^2$, or about 1000 mg/m$^2$. In some embodiments, the amount of capecitabine administered is about 200, 225, 250, 275, 300, 325, 350, 375, 400, 425, 450, 475, 500, 525, 550, 575, 600, 625, 650, 675, 700, 725, 750, 775, 800, 825, 850, 875, 900, 925, 950, 975, 1000, 1050, 1100, 1150, 1200, 1250, 1300, 1350, 1400, 1450, 1500, 1550, 1600, 1650, 1700, 1750, 1800, 1850, 1900, 1950, or 2000 mg/m$^2$, or a range defined by any two of the preceding values. In one embodiment, the amount of capecitabine administered is about 1000 mg/m$^2$. In some embodiments, capecitabine is for oral administration once or twice daily on days 1-21 of each 28-day (4 week) cycle. In some other embodiments, capecitabine is for oral administration once or twice daily on days 1-14 of each 21-day (3 week) cycle.

In some embodiments of the methods described herein, the subject is administered about 250 mg/m$^2$ ivaltinostat by intravenous infusion on day 1, day 8, and day 15 of each 28-day (4 week) cycle, in combination with about 100 mg/m$^2$ gemcitabine by intravenous infusion once per week for 3 weeks in each 28-day (4 week) cycle and about 100 mg/day erlotinib orally daily in each cycle. In some further embodiments, the subject is treated for at least 6 cycles.

In some embodiments of the methods described herein, the subject is administered about 60 to 250 mg/m$^2$ ivaltinostat by intravenous infusion on day 1 and day 8 of each 21-day (3 week) cycle, in combination with 1000 mg/m$^2$ capecitabine orally twice daily on days 1 to 14 of each 21-day cycle. In some such embodiments, the subject is treated for at least 10 cycles.

In some embodiments of the methods described herein, the pancreatic cancer is pancreatic adenocarcinoma, also referred to as pancreatic ductal pancreatic ductal adenocarcinoma (PDAC). In some such embodiments, the pancreatic adenocarcinoma is untreated locally advanced. In other embodiments, the pancreatic adenocarcinoma is metastatic. In further embodiments, the subject has been treated with a first line fluoropyrimidine-based chemotherapy, such as a FOLFIRINOX chemotherapy regimen (an abbreviation for a chemotherapy combination used to treat pancreatic cancer that has spread to other parts of the body. It may include but is not limited to the drugs leucovorin calcium, fluorouracil, irinotecan hydrochloride, and oxaliplatin). In further embodiments, the subject has been treated with a FOLFIRINOX chemotherapy regimen. In still further embodiments, the subject has metastatic pancreatic adenocarcinoma, and the subject has a response or stability with the first line fluoropyrimidine-based chemotherapy. In still further embodiments, the subject has metastatic pancreatic adenocarcinoma whose disease has not progressed on a first line fluoropyrimidine-based chemotherapy.

In any embodiments of the methods described herein, the method may further comprise selecting or identifying patients with untreated locally advanced or metastatic pancreatic adenocarcinoma whose disease has not progressed on a first line fluoropyrimidine-based chemotherapy.

Biomarkers

In some embodiments, one or more biomarkers may be used to monitor or determine the efficacy of the treatment. Correlative studies showed that mutation burden detected by cfDNA and specific blood markers such as TIMP1, pro-MMP10, PECAM1, proMMP-2 and IGFBP1 were associated with clinical outcomes for combination therapies as described herein. For example, a combination of ivaltinostat, gemcitabine and erlotinib was demonstrated as a treatment option for advanced PDAC.

Correlative studies were conducted to find biomarkers for predicting responsiveness to ivaltinostat with gemcitabine/ erlotinib combination therapy, and several biomarkers including cfDNA and protein biomarkers are disclosed herein.

In certain embodiments, correlative studies, as disclosed herein, provide serological protein markers for the prediction of the response to treatments as disclosed herein. The pretreatment blood level of TIMP1, pro-MMP10, and CD 31 (i.e. PECAM1), were observed to negatively correlated with progression-free survival (PFS) of the patients.

Good and poor responders demonstrated a difference before/after treatment in blood levels of pro-MMP2 and free IGFBP1. These markers, pro-MMP2 and free IGFBP1, were previously understood to be cell markers related to tumor microenvironments, including fibrosis and vascular functions. Accordingly, without being bound to a single theory of operation, the cell markers provided herein that are related to tumor microenvironments, including fibrosis and vascular functions may be biomarkers for predicting responsiveness to the ivaltinostat with gemcitabine/erlotinib combination therapy.

The activity of matrix metalloproteinases (MMPs) is thought to be important for cancer cells to invade through extracellular matrices. PDAC is characterized by a strong tumor microenvironment and contains many proteases consisting of MMPs. Experimental studies frequently use MMPs, including MMP2 and MMP10, as indicators for the diagnosis and progression of PDAC. TIMP1 is thought to be a natural inhibitor of MMP and may play a role in the diagnosis and progression of PDAC. CD31 is understood to be a pan-endothelial cell marker and there are some other reports of CD31 as a venous invasion marker for pancreatobiliary cancer. Tissue expression of CD31 is thought to be a poor prognostic factor associated with desmoplastic stroma in PDAC. One report indicated that circulating levels of CD31 decreased during treatment of metastatic breast cancer; however, the relationship between circulating CD31 and PDAC is not well known.

In certain embodiments, correlative studies, as disclosed herein, provide IGFBP-1 as a biomarker for the prediction of a patients' response to treatments as disclosed herein. IGFBP-1 is a component of the insulin growth factor axis and is thought to be related to cancer cell migration and metabolism. The clinical role of IGFBP-1 in PDAC development is still uncertain; however, without being bound to a single theory of operation, there is a correlation between IGFBP-1 and PDAC as several studies have reported that elevated blood IGFBP-1 is associated with poor prognosis in PDAC. In a blood biomarker study of results from the CALGB80303 trial, a phase III study comparing gemcitabine/bevacizumab versus gemcitabine/placebo, plasma IGFBP-1 elevations were observed to be related with poor survival in PDAC regardless of treatment group. The relationship between these markers and HDAC has been reported in several cancers, but the relationship in pancreatic cancer needs to be investigated. Anti-fibrotic and anti-angiogenetic effects are one of the presumed action mechanisms of HDACi's, including ivaltinostat, thus further evaluation is needed in PDAC. Since our study was a single-arm study, there are limitations in determining the clinical significance between markers and ivaltinostat therapy. These markers may also be prognostic markers of PDAC regardless of treatment.

cfDNA is considered a potential valuable tool in diagnosis, monitoring therapy response and postoperative recurrence in PDAC. cfDNA analysis was conducted in accordance with a targeted NGS strategy. A representative PDAC driver mutation, KRASmut, was detected in 75% of patients and was comparable to previously reported KRASmut detection rates (40-80%) in previously reported studies. The cfDNA analysis found that the anticancer effect was high in a group with less initial mutation burden, while poor responders presented an increasing tendency of mutation burden over time. These results demonstrate that the mutation burden detected by cfDNA is an indicator of the tumor response to ivaltinostat therapy and can be used to monitor the early response of a patient to treatment.

Overexpression of the HDAC family genes has been reported in PDAC and the HDAC family, and, without being bound to a single theory of operation, may be an important regulator of PDAC. Preclinical studies revealed that inhibition of HDAC could suppress tumor growth in pancreatic cancer cell lines. Nevertheless, HDACi's have shown limited success in clinical trials for solid tumors, including PDAC. A phase II study of tacedinaline, and an oral HDACi, combined with gemcitabine reported no advantage over gemcitabine alone in patients with advanced PDAC. Another phase II study of panovinostat with bortezomib in patients with PDAC after gemcitabine-based therapy was reportedly suspended due to lack of response and toxicity after only seven patients were enrolled. In the phase I/II study of mocetinostat for advanced PDAC, mocetinostat with gemcitabine combination was associated with significant toxicitie s and showed only limited clinical activity. A possible cause of the ineffectiveness of HDACi's in solid tumors may be their short half-life and low Cmax, which interfered with maintaining suitable treatment concentrations after the drug is delivered to the target organ. However, without being bound to a single theory of operation, ivaltinostat compensates for this weaknesses in pharmacokinetic properties due to the extended accumulation of acetylated histone in tumor tissues observed in previous animal and human studies.

In some embodiments, the specific biomarkers described herein may be used to monitor or determine the efficacy of the treatment and/or predict the outcome of the treatment.

EXAMPLES

Additional embodiments are disclosed in further detail in the following examples, which are not in any way intended to limit the scope of the claims.

Summary

The present disclosure discloses a phase I/II study that evaluated the safety and efficacy of the histone deacetylase (HDAC) inhibitor, ivaltinostat, in combination with gemcitabine and erlotinib for advanced pancreatic ductal adenocarcinoma (PDAC). Patients diagnosed with unresectable, histologically confirmed PDAC who had not undergone previous therapy were eligible. Phase I conformed to a 3+3 dose escalation design to determine the maximum tolerable dose (MTD) of ivaltinostat (intravenously on days 1, 8, and 15) with gemcitabine (1000 mg/m2 intravenously on days 1, 8, and 15) and erlotinib (100 mg/day, orally) for a 28-day cycle. In phase II, patients received a six-cycle treatment with the MTD of ivaltinostat determined in phase I. The primary endpoint was the objective response rate (ORR). Secondary endpoints included overall survival (OS), disease control rate (DCR), and progression-free survival (PFS). The MTD of ivaltinostat for the phase II trial was determined to be 250 mg/m$^2$. In phase II, 24 patients were enrolled. The median OS and PFS were 8.6 (95% confidence interval [CI]: 5.3-11.2) and 5.3 months (95% CI: 3.7-5.8). Of the 16 patients evaluated for response, ORR and DCR were 25.0% and 93.8% with a median OS/PFS of 10.8 (95% CI: 8.3-16.7)/5.8 (95% CI: 4.6-6.7) months.

Patients

Patients diagnosed with histologically confirmed unresectable PDAC without previous history of anticancer chemotherapy, radiation, or biologics were enrolled. Eligibility criteria included age 20 to 75 at enrollment; Eastern Cooperative Oncology Group performance status (ECOG PS) 0-2; estimated life expectancy at the time of enrollment was more than 3 months, and adequate hematologic (absolute neutrophil count 1500/mm3, hemoglobin 9.0 g/dL, platelets ≥100,000/mm3); hepatic (serum bilirubin <2× upper limit normal [ULN], aspartate aminotransferase [AST]/alanine aminotransferase [ALT]<2.5×ULN, Alkaline phosphatase <5× ULN (with liver metastasis, AST/ALT<5×ULN, prothrombin time [PT] or partial thromboplastin time 1.5× ULN); and renal function (serum creatinine or creatinine clearance rate 60 mL/min [using the Cockcroft-Gault equation] and normal serum electrolyte values [calcium: 8.3-10.5 mg/dL, magnesium: 1.58-3.0 mg/dL, phosphorous: 2.4-4.5 mg/dL, potassium: 3.3-5.5 mmol/L]).

Exclusion criteria included patients who had experienced a major surgery within 2 weeks prior to the screening visit with evidence of uncontrolled brain metastasis (except patients with radiologically and neurologically stable brain metastasis without corticosteroid therapy for at least 2 weeks); subjects ineligible for oral drugs, or having difficulty in absorbing the study drugs due to a history of major gastrointestinal surgery or pathological findings; patients treated with antibiotics within the last 7 days due to an active bacterial infection prior to the enrollment (topical antibiotic therapies were excluded); patients diagnosed with malignancies within past 5 years (except for basal cell skin cancer, in situ cervical cancer, or papillary thyroid tumor); pregnancy or lactating patients; fertile patients who did not consent to the effective contraception during the study period and up to 3 months after the completion of the study; patients ineligible for anti-cancer chemotherapy due to a systemic disease (i.e., chronic renal failure); patients treated with any other investigational drug within 4 weeks prior to the screening visit; patients with a history of hypersensitivity to the study drugs; and patients that were human immunodeficiency virus-positive.

Study Design and Treatment

One study disclosed herein was a single-arm phase I/II clinical study. The study evaluated the efficacy and safety of ivaltinostat in combination with gemcitabine and erlotinib for advanced pancreatic cancer. Phase I had a 3+3 dose escalation design to determine the maximum tolerable dose (MTD) and the dose-limiting toxicity (DLT) of ivaltinostat in combination with gemcitabine and erlotinib. The DLT was assessed according to the National Cancer Institute Common Toxicity Criteria version 4.0. A DLT was defined as: (i) grade 4 neutropenia lasting 6 or more days or grade 4 or grade 3 thrombocytopenia with bleeding or grade 3 neutropenia associated with fever >38.5° C.; (ii) any drug-related nonhematologic grade 3 or 4 toxicity with the exception of mucositis, nausea, vomiting, anorexia, dermatitis, and fatigue; (iii) drug-related nonhematologic grade 4 toxicity, including mucositis, nausea, vomiting, anorexia, dermatitis, and fatigue if supportive interventions were unsuccessful; (iv) alopecia was an exception for DLT regardless of grades; (v) treatment-related toxicities that caused discontinuation of treatment more than twice or occurring during 3 consecutive weeks, or total delay of treatment for more than 3 weeks.

The MTD was defined as the dose at which one or zero patients developed a DLT among six-patient cohort. Based on the 3+3 dose escalation design, each cohort consists of three or six subjects. If one in three subjects had experienced DLT in a specific dose, the dose was administered to an additional three subjects and a total of six patients were checked for the occurrence of DLT. If two or more subjects in any cohort had experienced a DLT, the previous dose was considered MTD, and the dose escalation ended. The initial dose of ivaltinostat was 187.5 mg/m$^2$ and extended to 250 mg/m$^2$ or 312.5 mg/m$^2$ based on the results of the cohort of three subjects per dose level. Gemcitabine and erlotinib were administered as fixed doses; gemcitabine (1000 mg/m$^2$ intravenously), and erlotinib (100 mg/day orally), whereas ivaltinostat was administered according to the dose level for each cohort. Each cycle consisted of 28 days. Both ivaltinostat and gemcitabine were administered on days 1, 8, and 15 and erlotinib was administrate d daily for each 28-day cycle.

Overall, 24 patients were enrolled in phase II, which utilized Simon's 2 stage design, and received ivaltinostat (250 mg/m$^2$ intravenously, determined based on the results of phase I study), gemcitabine (1000 mg/m$^2$ intravenously), and erlotinib (100 mg/day orally). Both ivaltinostat and gemcitabine were administered via the same protocol as that in the phase I study, until development of unacceptable toxicity or disease progression. The entire treatment period was six cycles and could be extended to 12 cycles if the patients wanted to continue the regimen and the principal investigator agreed. Tumor assessment was evaluated at the end of every two cycles. Dose reduction or delay could be applied for intolerant patients according to the study protocol.

Assessments

The primary endpoint was the ORR, which was defined as the rate (%) of patients who had best tumor assessment with complete response (CR) or partial response (PR) during the treatment period. Secondary endpoints included disease control rate (DCR), OS, and progression-free survival (PFS). DCR was defined as the rate (%) of patients who had best tumor assessment with CR, PR, or stable disease (SD) during the treatment period. OS was defined as the time from the date of the first enrollment to the date of death from any cause. Patients who were still alive or withdrew at the date of cut off were censored. PFS was defined as the time from the date of the first enrollment to the date of tumor progression or to the date of death from any cause. Patients were followed up for survival until death, withdrawal, or study closure.

Tumor evaluation was performed at baseline, at the end of every two cycles, and/or at the end of the trial. For patients with measurable/non-measurable lesions, the Response Evaluation Criteria in Solid Tumors version 1.1 was used to evaluate target/non-target lesions. Serial measurements of carbohydrate antigen 19-9 (CA19-9) levels were performed at baseline and at the beginning of each treatment cycle. Patients were followed up for survival until death or study closure. Safety evaluation included vital signs, adverse events (AEs), adverse drug reactions, serious AEs, ECG, and clinic al laboratory tests, which were performed on days 1, 8 and 15 each cycle. AEs were graded according to the Common Terminology Criteria for Adverse Events, version 4.0, by the National Cancer Institute.

Full analysis set (FAS), per protocol (PP), and safety set analysis were defined according to the study protocol. FAS was defined as patients who had been evaluated for tumor response at least once after baseline. The PP analysis set included patients who received at least 70% and more of the intended study drug throughout the treatment period and without any significant violation of the protocol. The safety cohort included all patients who had received the study drug at least once.

Correlative Studies

Patient's Blood Sample Collection: Peripheral blood samples for correlative studies including cfDNA analysis, protein array and ELISA analyses were collected pre-dose on days 1 and 8 of the first treatment cycle, on days 1, 3 and 5 of the treatment cycle and on the day the treatment ended. The blood sample was transferred to a plain tube and an EDTA-containing tube immediately after collection, centrifuged within 30 min and stored below −70° C.

cfDNA Analysis: cfDNA samples were extracted from plasma samples. The concentration of DNA sample was assayed using the Qubit Fluorometer and the size distribution was measured using TapeStation. DNA barcodes were attached to samples during barcoding PCR reaction to distinguish each sample in sequencing process. The PCR product for each sample was pooled and subsequently purified. The sample sets were subjected to the enrichment process for 96 mutations. The enriched outputs were used for library preparation, and the final library was sequenced on the Illumina MiSeq. Sequencing data was analyzed in a fully automated fashion using BWA analysis scripts for alignment to a custom reference library composed of sequences within the 96-gene mutation panel, and using SAM Tools for further data manipulation following alignment. Mutation quantification was performed using in-house scripts. ONCOCHASER (Theragen Bio Inc. Gyeonggi-do, Korea) test reports on the absence or presence of each 96 mutations with over 2 mutant DNA copies per plasma samples. The input DNA mass was the total amount of cfDNA from the plasma sample used in the assay. Since the assay detects internal positive controls to measure all copies of the genome, the input DNA mass may differ from the Qubit mass. Mutant DNA abundance (%) was also reported relative to input DNA mass, with reference to limit of detection.

Protein Array: Protein was extracted from plasma using a protein extraction buffer (Fullmoon Biosystems, Sunnyvale, CA) and protein expression was analyzed using antibody microarray analysis (Fullmoon Biosystems) according to the manufacturer's protocol. Briefly, 50 □g of protein sample was labeled and incubated with coupling mixture on the antibody microarray slide (Fullmoon Biosystems) and detected with Cy3-streptavidin (GE Healthcare, Chalfont St. Giles, UK). The slide was rinsed scanned using the GenePix 4100A scanner (Axon Instrument, USA) at 10 m resolution, optimal laser power and PMT. Following image scanning, they were gridded and quantified with GenePix 7.0 Software (Axon Instrument, USA). The protein information was annotated using UniProt DB. Comparing good and poor responders to treatment, markers that clearly showed a difference in expression before and after treatment were selected as subjects for further verification by ELISA.

ELISA Analysis: Serological marker measurement was performed using ELISA kits according to the manufacturer's protocols: IL4 (D4050), TIMP1 (DTM100), IL3 (D3000), ILIA (DLA50), PDGFB (DBB00), TEK (or TIE2, DTE200), PECAM1 (DCD310), MMP2 (MMP200), pro-MMP10 (DM1000), KLK3/PSA (DKK300), free IGFBP1 (DGB100), CX3CL1 (DCX310), IL19 (D1900) (all R&D SYSTEMS); and YAP (LifeSpan BioSciences, Inc., LS-F49700). A calibration curve was generated using known concentrations of analyte. Samples were further diluted and re-assayed if readings were above the linear range of the calibration curve. Data are reported as mean±standard deviation. The degree of correlation between blood markers and patient PFS were evaluated to choose potential biomarkers for predicting responses to treatment or disease prognosis.

Statistical Analysis: To identify MTD and DLT, the 3+3 dose escalation design was utilized and based on the method of determining MTD described above. In total, 10 patients were enrolled in the phase I study. The estimated sample size for the phase II study after the determination of MTD was calculated based on Simon's 2 stage design25 with a reference of published data of 8.6% ORR from a phase III randomized controlled trial of gemcitabine and erlotinib combination therapy. Assuming a difference in response probability of study drug=20%, α=0.05, and statistical power=90%, the estimated minimally required sample size for phase II study based on binomial distribution probability may be 9 for initial stage and increase to a total of 24 patients if more than one patient had responded to the study drug during the initial stage. The safety analysis included all patients who had received a single dose of the study drug. The main efficacy analysis was based on the FAS population, defined as a group of patients who had received at least single dose of study drug and had at least one tumor response evaluation after the baseline assessment.

Data analysis was performed using IBM SPSS 748 Statistics for Windows, v25.0 (IBM Corp, Armonk, NY). Data from patients who were alive at that time were censored for survival analysis. Statistical analysis of correlated studies used Pearson's correlation and Mann-Whitney U test to evaluate the correlation of ELISA results with patient outcomes. Data analyses were performed using GraphPrism v5.0 (GraphPad Software, CA, U.S.).

Results

Patients Characteristics: The baseline demographic and disease characteristics of patients for the phase I/II study are summarized in Table 1. Ten patients (six male and four female) with a median age of 59 years were enrolled in the phase I study. One subject presented ECOG PS2 (10%) and others presented ECOG PS1 (90%). Baseline CA19-9 was 599 U/mL (median), and primary tumor sites were four in the head (40%), five in the body or tail (50%) of the pancreas and one in an overlapped area (10%). One patient had locally advanced disease (10%) and nine patients had metastatic disease (90%).

FIG. 1 presents a schematic summary of the phase I study. Ten patients received three different dose levels of ivaltinostat with gemcitabine and erlotinib. One DLT, a febrile neutropenia of grade 3, was observed among the four patients who received the 312.5 mg/m$^2$ dose of ivaltinostat. According to the protocol, two more patients were supposed to be enrolled in the same dose cohort. However, due to the increased frequency and severity of AEs at the dose level of 312.5 mg/m$^2$ compared to the cohorts of lower dose levels, the Data and Safety Monitoring Board recommended not continuing at that dose level of 312.5 mg/m$^2$. Thus, MTD and the recommended dose for phase II for ivaltinostat was determined to be 250 mg/m$^2$.

Pharmacokinetic analyses: The half-life (t1/2) of ivaltinostat at the dose level of 187.5, 250, and 312.5 mg/m$^2$ was 7.3, 5.7, and 6.6 h, respectively. AUC0-24 h of ivaltinostat at the dose level of 187.5, 250, and 312.5 mg/m$^2$ were 28264, 35143, and 65431 h*ng/mL, while Cmax was 9553, 8062, and 12782 ng/ml, respectively.

Efficacy: Twenty-four patients (13 male and 11 female) with a median age of 64 years (range 47.3-74.7) were enrolled in phase II study. The location of the primary tumor site was observed mainly in the body/tail (62.5%) and the head (33.3%) of the pancreas (Table 1). One patient presented ECOG PS0 (4.2%) and the other patients presented ECOG PS1 (95.8%). The baseline CA19-9 was 456 U/mL (median), seven patients had locally advanced disease (29.2%), and 17 patients had metastatic disease (70.8%).

TABLE 1

Patient Demographics and Disease Characteristics

| Characteristics | Part 1 | Part 2 | Total |
|---|---|---|---|
| Number of Subjects | 10 | 24 | 34 |
| Age, years (Mean ± SD) | 59.8 ± 11.7 | 62.7 ± 7.7 | 61.9 ± 9.0 |
| Median | 59.3 | 64.3 | 63.4 |
| Sex, no. (%) | | | |
| Female | 4 (40.0) | 11 (45.8) | 15 (44.2) |
| Male | 6 (60.0) | 13 (54.2) | 19 (55.9) |
| ECOG PS, no. (%) | | | |
| 0 | 0 (0.0) | 1 (4.2) | 1 (2.9) |
| 1 | 9 (90.0) | 23 (95.8) | 32 (94.1) |
| 2 | 1 (10.0) | 0 (0.0) | 1 (2.9) |
| Baseline CA 19-9, U/mL (Median, range)† | 599 (2-20000) | 456 (1-20000) | 549 (1-20000) |
| Primary Tumor Site, no. (%) | | | |
| Head | 4 (40.0) | 8 (33.3) | 12 (35.3) |
| Body or Tail | 5 (50.0) | 15 (62.5) | 20 (58.8) |
| Overlap | 1 (10.0) | 1 (4.2) | 2 (5.9) |
| Extent of Disease, no (%) | | | |
| Locally Advanced | 1 (10.0) | 7 (29.2) | 8 (23.5) |
| Metastatic | 9 (90.0) | 17 (70.8) | 26 (76.5) |

Abbreviation:
SD; standard deviation,
ECOG PS; Eastern Cooperative Oncology Group performance status
†Measurement upper limit of the CA 19-9 was 20000 U/mL.

FIG. 1 presents the trial flow of the phase II study. 8 of 24 patients were dropped early from the study without any response evaluation after the baseline; thus, 16 patients were included in the FAS analysis according to the study protocol. The reasons for the 8 early drop-outs were: patient's choice (four cases, 50%), general weakness (two cases, 25%), poor conditions due to cancer (one case, 12.5%), and cancer-related death (one case, 12.5%). Ten patients were included in the PP analysis after six patients were excluded due to failure to complete >70% of the intended treatment of six cycles. All patients, except one patient who withdrew consent (n=23), were followed every 2 months for survival analysis.

Figures 2A, 2B:
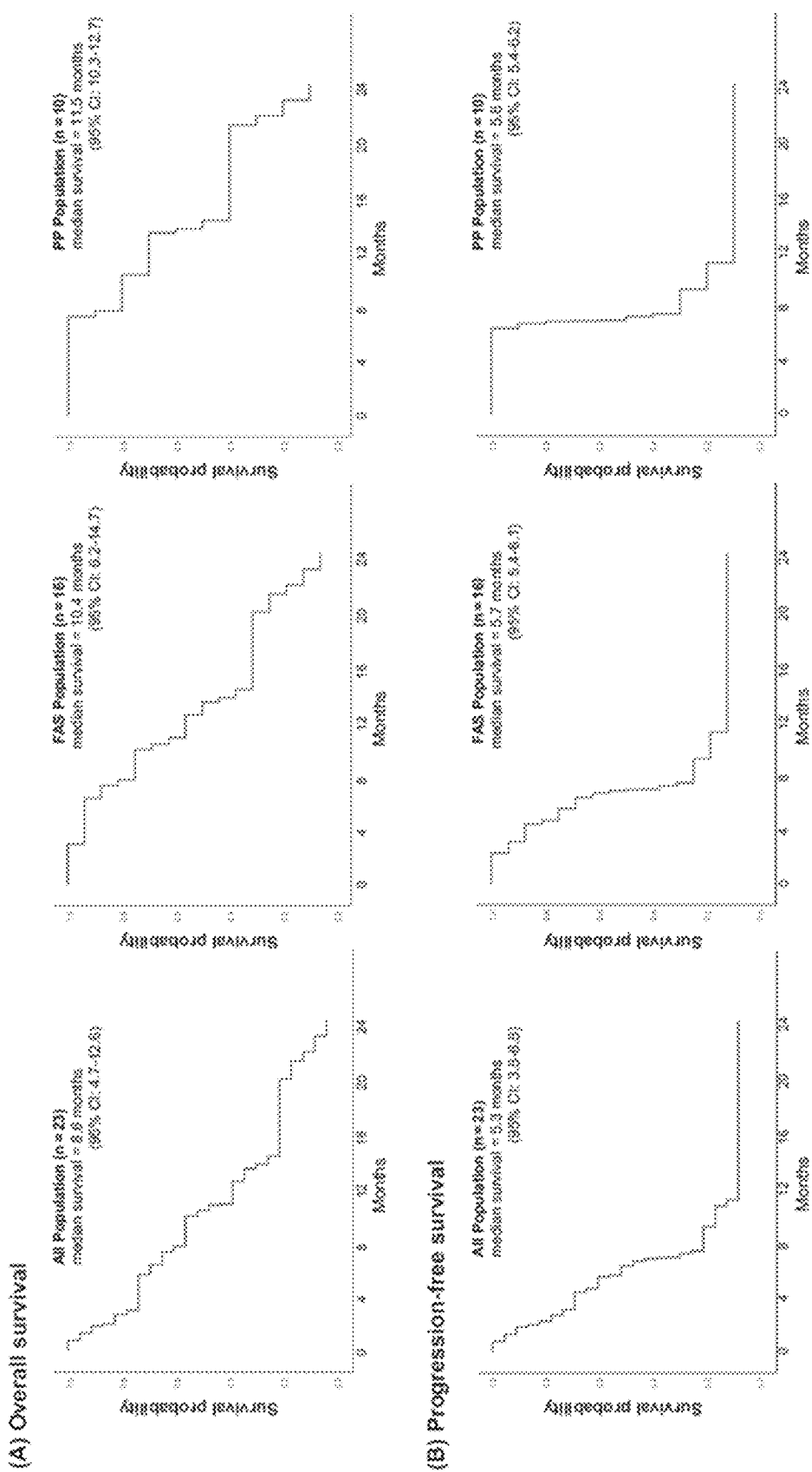
FIGS. 2(A) and 2(B) show Kaplan-Meier curves for overall survival and progression-free survival for the phase II patients.

FIGS. 2(A) and 2(B) present Kaplan-Meier curves for OS and PFS respectively. At the time of the final follow-up for OS, 15 patients had died, 7 patients were lost to follow-up, and one patient was still alive. All causes of death were related to cancer. Median OS and PFS based for all patients (n=23) were 8.6 months (95% CI: 5.3-11.2) and 5.3 months (95% CI: 3.7-5.8), respectively. In the FAS analysis (n=16), ORR was 25.0% and DCR was 93.8% with 4 PRs (25%) and 11 SDs (68.8%). Median OS was 10.8 months (95% CI: 8.3-16.7) and median PFS was 5.8 months (95% CI: 4.6-6.7). In the PP analysis (n=10), ORR was 30% and DCR was 100% with 3 PRs (30%), and 7 SDs (70%). Median OS was 11.7 months (95% CI: 8.6-18.4) and median PFS was 5.9 months (95% CI: 5.7-8.5).

Safety and Adverse Events: Twenty-four patients received at least one dose of ivaltinostat and were included in the safety analysis. The patients received a median of 3.8 cycles (mean 3.6 cycles) with a range of 0.33 to six cycles of treatment, with ten patients completing six cycles of treatment. Of these, nine patients stayed on their starting dose of the study drug for the entire duration of treatment. Doses of ivaltinostat and gemcitabine were reduced in three of 24 patients (12.5%, respectively) due to occurrence of AEs and no patient received a reduced dose of erlotinib.

Of the 218 AEs reported, 114 adverse drug reactions (ADRs) occurred among all 24 subjects. The most frequently reported ADRs were decreased platelet count (15 events), decreased appetite (11 events), rash (11 events), nausea (10 events), and vomiting (10 events). A total of 26 ADRs with grade 3 or 4 severity were reported in 15 subjects (62.5%) (Table 2 below). There were no grade 5 (death) events.

The most frequently reported treatment-related grade 3 or 4 AEs were neutropenia (eight cases, 33.3%), thrombocytopenia (seven cases, 29.2%), and anemia (four cases, 16.7%). All AEs were well controlled with supportive treatment, there were no cases that had dropped out of the study due to intolerable AEs.

TABLE 2

NCI-CTCAE Grade 3 and 4 treatment-related adverse events in phase II study

| System Organ Class | Adverse events | Number of patients (%) | | |
|---|---|---|---|---|
| | | Grade 3 (n = 24) | Grade 4 (n = 24) | Total (n = 24) |
| Hematologic | Neutropenia | 3 (12.5) | 5 (20.8) | 8 (33.3) |
| | Febrile neutropenia | 2 (8.3) | 0 | 2 (8.3) |
| | Thrombocytopenia | 4 (16.7) | 3 (12.5) | 7 (29.2) |
| | Anemia | 4 (16.7) | 0 | 4 (16.7) |
| Non-hematologic | Pneumonia | 0 | 1 (4.2) | 1 (4.2) |
| | Fatigue | 2 (8.3) | 0 | 2 (8.3) |
| | Anorexia | 2 (8.3) | 0 | 2 (8.3) |

Figure 3:
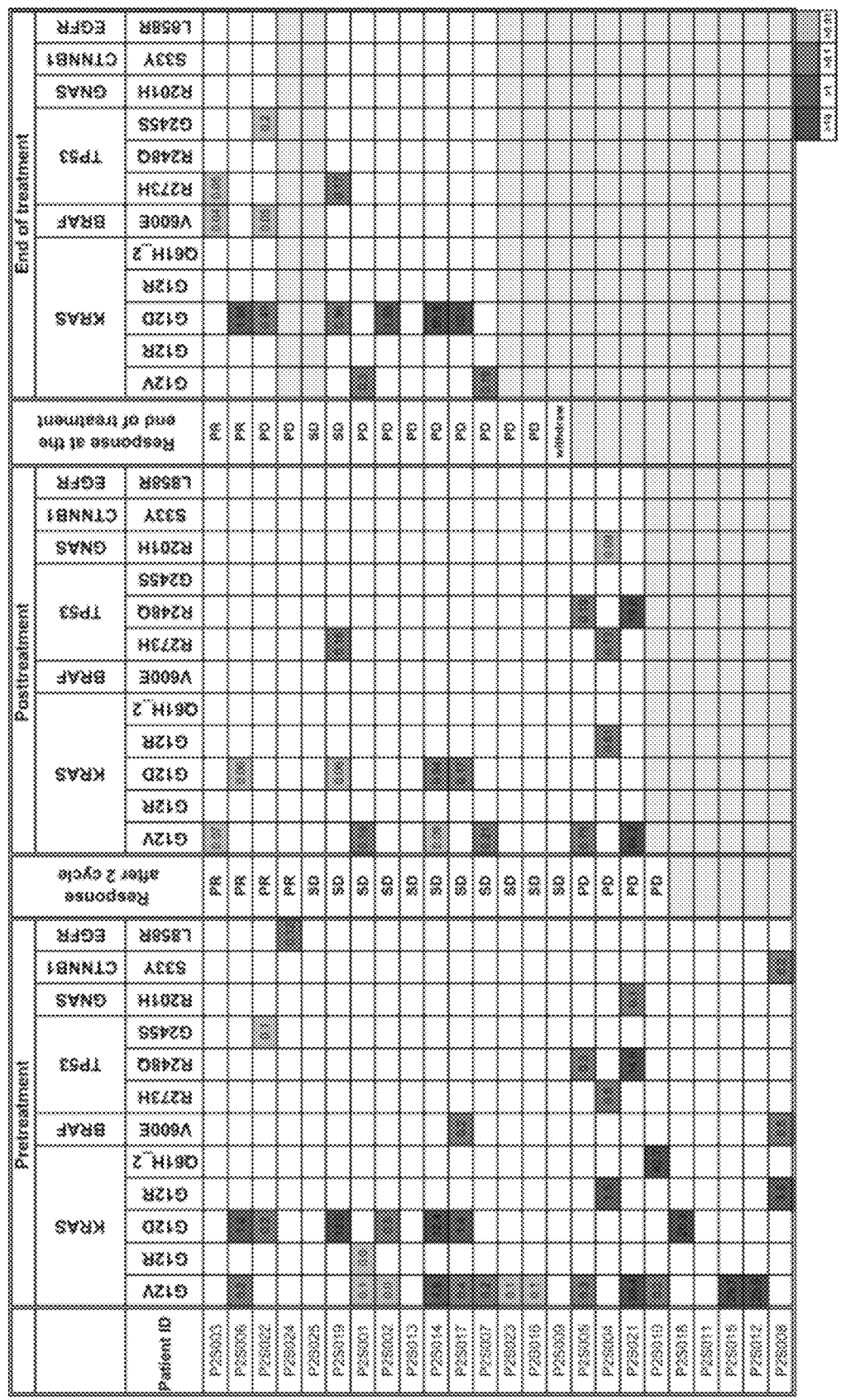
FIG. 3 shows the change in tumor mutation burden at the beginning of the study and after treatment over time. Mutant DNA abundance (%) is presented by yellow (low) to red (high) color.

Correlative Studies: According to previous reports, KRAS (~90%) and TP53 mutations (50-60%) were observed with high frequency, while GNAS, BRAF, CTNNB1, and EGFR mutations were observed at low frequency. FIG. 3 shows representative genetic mutations of PDAC among the patients in the study, listed in the order of response to therapy. The initial mutation rate of KRAS was 75% (18/24 cases) and TP53 was 16.7% (4/24 cases). BRAF, GNAS, CTNNB1, and EGFR were mutated in 1 or 2 of 24 cases. Patients who achieved a PR after 2 cycles of therapy presented lower mutation burden in expression level and diversity, compared to patients who achieved stable disease (SD) or progressive (PD). In general, patients who obtained PD after 2 cycles or could not be evaluated due to poor general condition or death showed higher mutation burden. Additionally, the overall mutation burden of patients with PR or SD showed a decreasing trend, while those of patients with PD showed an increasing trend. These findings may suggest that the mutation burden detected by cfDNA reflects the tumor response to ivaltinostat therapy and can be used to monitor the early response of each patient after treatment.

To determine potential markers of use in predicting chemotherapy responses to ivaltinostat or disease prognosis, patient samples were analyzed at the time of pretreatment, on day 8 after treatment, and at the end of the trial using antibody microarray analysis. Three good and three poor responders were selected to compare differences in marker expression stratified by patient treatment response. Accordingly, protein expression had clearly changed according to the patient's prognosis. Comparing individual patients before and after treatment, specific protein markers could clearly distinguish patients according to prognosis. Differently expressed markers in the poor responders were compared to the good responders at pretreatment, and differently expressed markers on day 8 and at end of the trial compared to pretreatment were selected for validation by ELISA in all available patient samples.

Figures 4A, 4B:
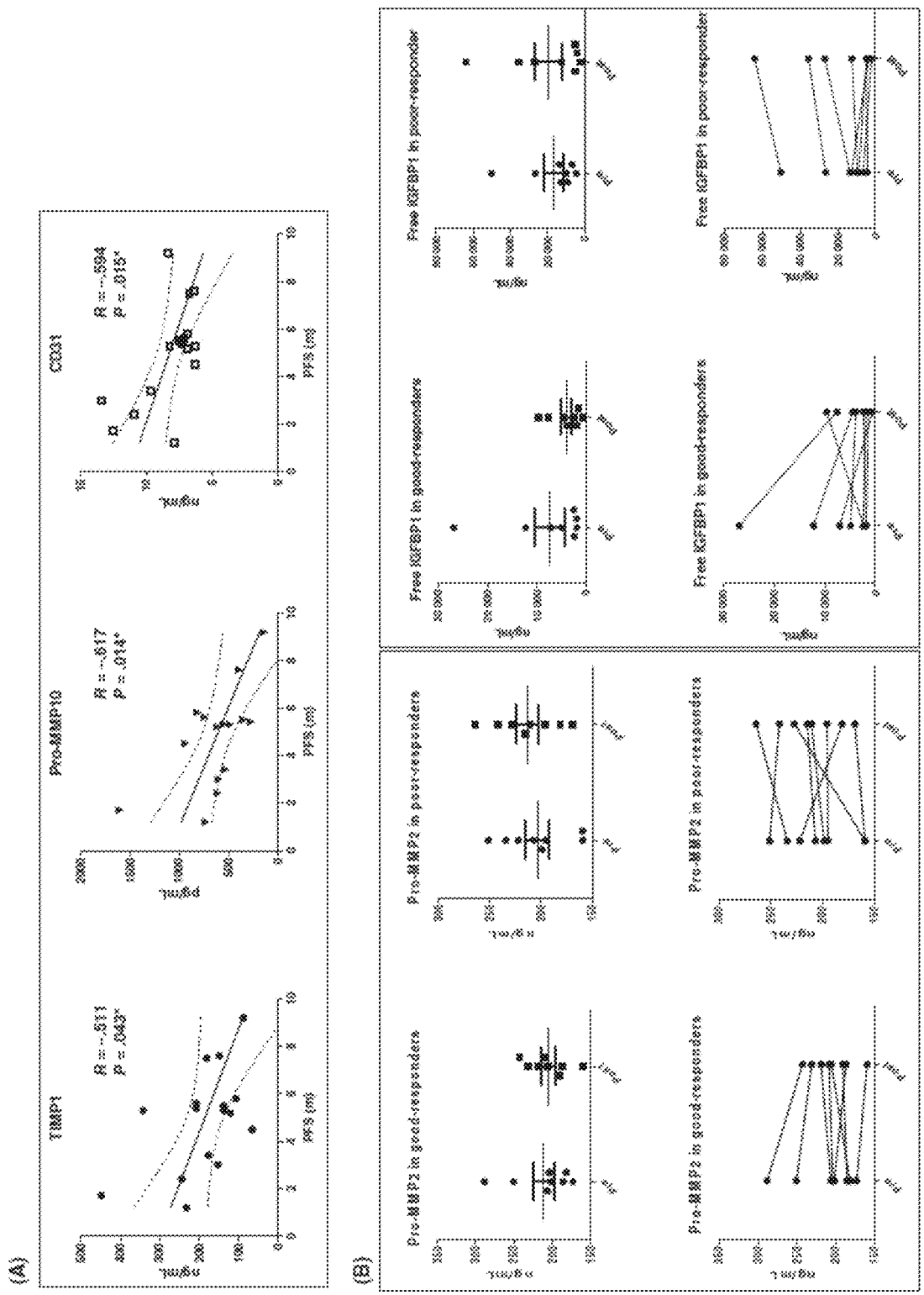
FIGS. 4(A) and 4(B) show expression of blood markers evaluated by ELISA.

Serial blood samples at pretreatment and post-treatment (day 8), were available for 16 patients for ELISA analysis. The degree of correlation between blood markers and PFS of patients were examined using Pearson's correlation coefficient (FIG. 4(A)). A negative correlation trend with PFS was observed with expression levels of TIMP1 (R=−0.511, p=0.043), pro-MMP10 (R=−0.617, p=0.014) and CD 31 (=PECAM1) (R=−0.594, p=0.015) between the markers tested. These three markers were considered potential biomarkers to predict the chemotherapy response to ivaltinostat before treatment. To determine early response markers, 16 patients were divided into good responders (n=8) and poor responders (n=8) according to PFS. FIG. 4(B) shows the down regulation of pro-MMP2 and free IGFBP1 in responders, whereas these markers were up-regulated in non-responders. Thus, blood markers may have a potential role as response predictors of ivaltinostat in patients with PDAC.

What is claimed is:

1. A method of treating pancreatic cancer in a subject in need thereof, comprising:
   receiving information on a subject's serological protein biomarker PECAM1 (CD31) expression level prior to the treatment;
   selecting the subject with a PECAM1 expression level of about 7.5 ng/ml or less; and
   administering an effective amount of ivaltinostat in combination with one or more additional anti-cancer agents to the subject.

2. The method of claim 1, wherein the method comprises selecting the subject with the PECAM1 expression level of about 6 ng/ml or less.

3. The method of claim 1, wherein the serological protein biomarker PECAM1 has a negative correlation with progression-free survival (PFS).

4. The method of claim 3, wherein the subject has a PFS of at least 3, 4, 5, 6, 7, 8, 9, 10, 11 or 12 months.

5. The method of claim 3, wherein the effective amount of ivaltinostat is from about 10 mg/m$^2$ to about 250 mg/m$^2$.

6. The method of claim 5, wherein the effective amount of ivaltinostat is about 60 mg/m$^2$, about 125 mg/m$^2$, or about 250 mg/m$^2$.

7. The method of claim 3, wherein ivaltinostat is administered by intravenous infusion.

8. The method of claim 7, wherein the intravenous infusion is over about 30 minutes to about 120 minutes, about 50 minutes to about 70 minutes, or about 60 minutes.

9. The method of claim 3, wherein ivaltinostat is administered orally.

10. The method of claim 3, wherein ivaltinostat is administered on day 1, day 8, and day 15 of each 28-day (4 week) cycle, or administered on day 1 and day 8 of each 21-day (3 week) cycle.

11. The method of claim 10, wherein the treatment is repeated at least 3 cycles.

12. The method of claim 3, wherein the one or more additional anti-cancer agents comprises gemcitabine or erlotinib, or a combination thereof.

13. The method of claim 12, wherein gemcitabine is administered in an amount from about 500 mg/m$^2$ to about 2000 mg/m$^2$, from about 750 mg/m$^2$ to about 1500 mg/m$^2$, or about 1000 mg/m$^2$.

14. The method of claim 13, wherein gemcitabine is administered by intravenous infusion once per week for 3 weeks in each 28-day (4 week) cycle.

15. The method of claim 13, wherein gemcitabine is administered by intravenous infusion once per week for 2 weeks in each 21-day (3 week) cycle.

16. The method of claim 12, wherein erlotinib is administered in an amount from about 50 mg to about 200 mg, from about 75 mg to about 150 mg, or about 100 mg.

17. The method of claim 16, wherein erlotinib is administered orally one, two, three or four times daily in each cycle of the treatment.

18. The method of claim 3, wherein the one or more additional anti-cancer agents comprise capecitabine.

19. The method of claim 18, wherein capecitabine is administered in an amount from about 200 mg/m$^2$ to about 2000 mg/m$^2$, from about 500 mg/m$^2$ to about 1500 mg/m$^2$, from about 750 mg/m$^2$ to about 1250 mg/m$^2$, or about 1000 mg/m$^2$.

20. The method of claim 19, wherein capecitabine is for oral administration once or twice daily on days 1-21 of each 28-day (4 week) cycle.

21. The method of claim 19, wherein capecitabine is for oral administration once or twice daily on days 1-14 of each 21-day (3 week) cycle.

22. The method of claim 3, wherein the subject is administered about 250 mg/m$^2$ ivaltinostat by intravenous infusion on day 1, day 8, and day 15 of each 28-day (4 week) cycle, in combination with about 1000 mg/m$^2$ gemcitabine by intravenous infusion once per week for 3 weeks in each 28-day (4 week) cycle and about 100 mg/day erlotinib orally daily.

23. The method of claim 22, wherein the subject is treated for 6 cycles.

24. The method of claim 3, wherein the subject is administered about 60 to 250 mg/m$^2$ ivaltinostat by intravenous infusion on day 1 and day 8 of each 21-day (3 week) cycle, in combination with 1000 mg/m$^2$ capecitabine orally twice daily on days 1 to 14 of each 21-day cycle.

25. The method of claim 24, wherein the subject is treated for at least 3 cycles.

26. The method of claim 3, wherein the pancreatic cancer is pancreatic adenocarcinoma.

27. The method of claim 26, wherein the pancreatic adenocarcinoma is unresectable locally advanced.

28. The method of claim 26, wherein the pancreatic adenocarcinoma is metastatic.

29. The method of claim 3, wherein the subject's pancreatic cancer has not progressed on a first line fluoropyrimidine-based chemotherapy.

30. The method of claim 1, further comprising adjusting pancreatic cancer treatment based on the subject's response to the treatment.

* * * * *